United States Patent
Rizzoni et al.

(10) Patent No.: US 6,766,230 B1
(45) Date of Patent: Jul. 20, 2004

(54) MODEL-BASED FAULT DETECTION AND ISOLATION SYSTEM AND METHOD

(75) Inventors: Giorgio Rizzoni, Upper Arlington, OH (US); Ahmed Soliman, Upper Arlington, OH (US); Pierluigi Pisu, Columbus, OH (US); Sanket S. Amberkar, Ann Arbor, MI (US); Brian T. Murray, Novi, MI (US)

(73) Assignees: The Ohio State University, Columbus, OH (US); Delphi Automotive Systems, Brighton, MI (US)

( * ) Notice: Subject to any disclaimer, the term of this patent is extended or adjusted under 35 U.S.C. 154(b) by 0 days.

(21) Appl. No.: 10/039,634

(22) Filed: Nov. 9, 2001

Related U.S. Application Data

(60) Provisional application No. 60/247,849, filed on Nov. 9, 2000.

(51) Int. Cl.[7] .............................................. G06F 19/00
(52) U.S. Cl. ......................................... 701/29; 701/33
(58) Field of Search ...................................... 701/29, 33

(56) References Cited

U.S. PATENT DOCUMENTS

| | | | |
|---|---|---|---|
| 5,481,906 A | 1/1996 | Nagayoshi et al. ........... 73/116 |
| 5,726,541 A | 3/1998 | Glenn et al. ................... 318/16 |
| 5,796,990 A | 8/1998 | Erle et al. ..................... 395/500 |
| 6,014,598 A * | 1/2000 | Duyar et al. ................... 701/29 |
| 6,117,180 A | 9/2000 | Dave et al. .................... 703/20 |
| 6,119,111 A * | 9/2000 | Gross et al. ................... 706/15 |
| 6,144,904 A * | 11/2000 | Tseng ........................... 701/34 |
| 6,223,104 B1 | 4/2001 | Kamen et al. ................. 701/1 |
| 6,256,594 B1 | 7/2001 | Yamamoto et al. ......... 702/185 |
| 6,434,512 B1 * | 8/2002 | Discenzo ..................... 702/184 |
| 6,470,300 B1 * | 10/2002 | Benzinger et al. .......... 702/190 |

\* cited by examiner

*Primary Examiner*—Michael J. Zanelli
(74) *Attorney, Agent, or Firm*—Standley Law Group LLP

(57) ABSTRACT

A model-based Fault Detection and Isolation (FDI) system and method based on a hierarchical structure for monitoring overall vehicle system performance and diagnosing faults is disclosed. The FDI scheme uses the available sensors in a vehicle system and divides them into subsystems of smaller dimensions containing one or more modules that are related or interconnected. The same module may appear in a different subsystem, but the set of all subsystems does not have to contain all of the modules. For this structure, an FDI scheme comprising several detector units is created. Each detector unit receives information from the sensors and outputs a residual that is sent to a residual evaluation unit which processes the data and performs the residual evaluation for the selected subsystem. Finally, each subsystem outputs a decision that is sent to a supervisor unit performing the final diagnosis.

25 Claims, 23 Drawing Sheets

US 6,766,230 B1

MODEL-BASED FAULT DETECTION AND ISOLATION SYSTEM AND METHOD

This application claims the benefit of U.S. Provisional Patent Application No. 60/247,849 entitled FAULT DETECTION AND ISOLATION SYSTEM AND METHOD and filed Nov. 9, 2000.

TECHNICAL FIELD

The present invention is in the field of control system design. More particularly, the present invention is a model-based fault detection and isolation system and method for monitoring overall system performance and diagnosing faults. The system and method of the present invention may be applied to vehicle control systems.

BACKGROUND AND SUMMARY OF THE INVENTION

In recent years, increasing interest and requirement for improved vehicle performance, reliability, and safety has focused attention on the use of Fault Detection & Isolation (FDI) when designing vehicle control systems. Fault detection and isolation is becoming one of the most important aspects in vehicle system control design. In order to meet the increasing demand for better performance and reliability, model-based FDI schemes are being developed to address complete vehicle systems, to detect faults in sensors and actuators, and to apply appropriate corrective action without adding new hardware to the vehicle. However, the high complexity of most vehicle systems makes the standard FDI model-based technique difficult to apply without unacceptable computational effort.

The present invention is a novel system and method based on a hierarchical structure of the FDI scheme that reduces the computational effort of prior art systems. The FDI scheme uses the available sensors and actuators in a system such as a vehicle system and divides them into subsystems of smaller dimensions containing one or more modules that are related or interconnected. The same module may appear in a different subsystem, but the set of all subsystems does not have to contain all of the modules. For this structure, an FDI scheme comprising several detector units is created. Each detector unit receives information from the sensors and outputs a residual that is sent to a residual evaluation unit which processes the data and performs the residual evaluation for the selected subsystem. Finally, each subsystem outputs a decision that is sent to a supervisor unit performing the final diagnosis.

DETAILED DESCRIPTION OF THE INVENTION

The present invention may be implemented in accordance with software components that provide the features and functionality described herein. The system and method of the present invention may be applied to any machine equipped with sensors and actuators that requires reliability, safety, and availability.

Figure 1:
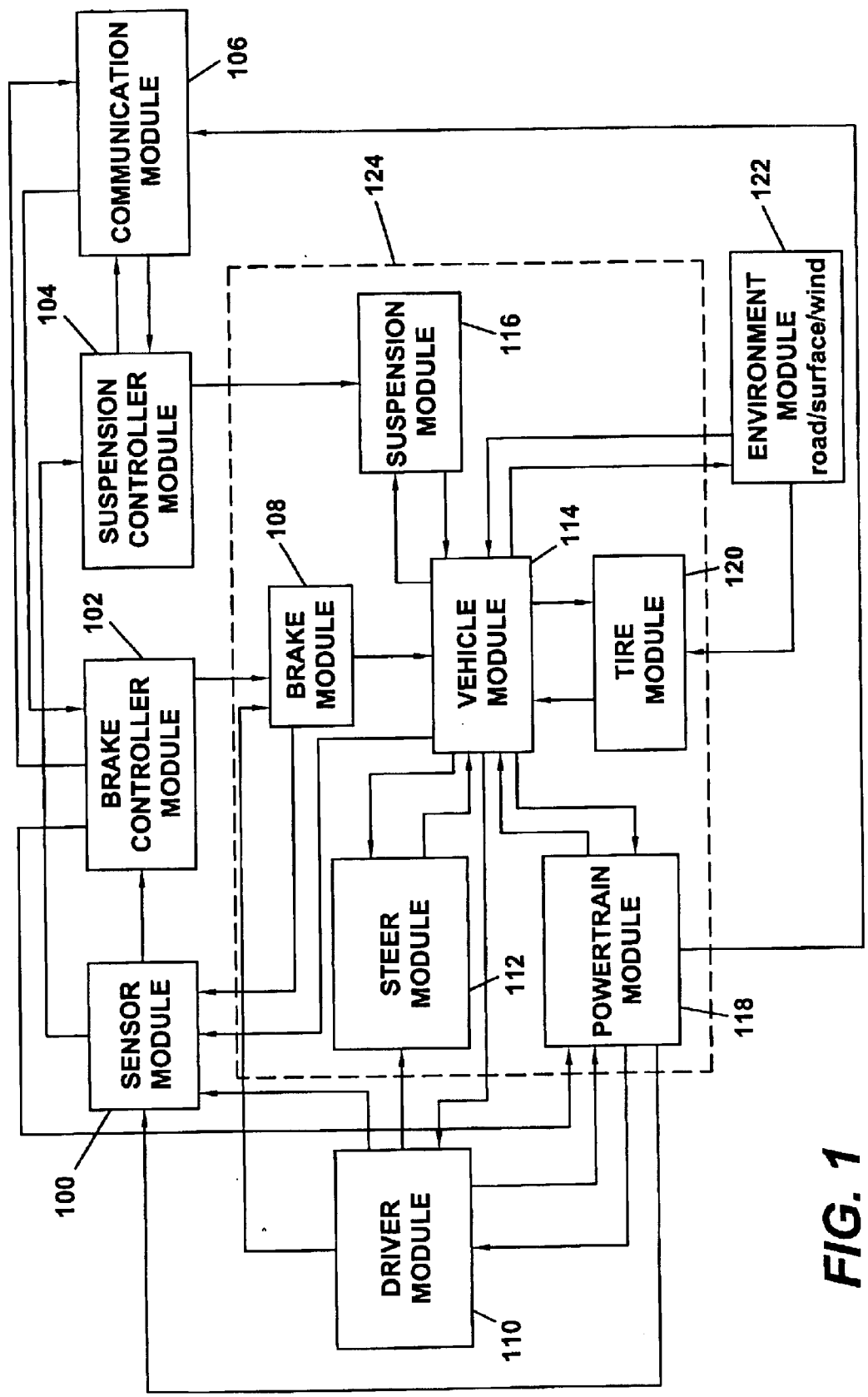
FIG. 1 is a block diagram of a vehicle model for an example embodiment of the present invention.

Referring to FIG. 1 in an example embodiment of the present invention in which the system and method are applied to a vehicle control system, a vehicle may be represented, in general, as a block diagram as shown in FIG. 1 constituting of two main subsystems: the core subsystem 124 and the external subsystem. The core subsystem 124 comprises the vehicle 114, tire 120, powertrain 118, steering 112, suspension 116, and brake 108 modules. Each module may comprise one or more models adapted to accept input from one or more sensors and to process input to produce one or more outputs representing aspects of the model. The vehicle module 114 comprises a 16DOF vehicle model. The vehicle model further comprises a vehicle body, (i.e., the sprung mass), and four wheels, (i.e., the unsprung masses). The model contains three translational degrees of freedom-longitudinal, lateral, vertical, and three rotational degrees of freedom-roll, pitch, and yaw for the sprung mass. Each of the unsprung masses has vertical, spin, and steering angle degrees of freedom. The tire module 120 has as inputs the longitudinal slip, the lateral slip, the vertical load, and the camber angle which gives as output the longitudinal and lateral force as well as aligning moment. The powertrain module 118 comprises the engine, the transmission, and the differential models. The engine uses a lookup table with throttle position and engine speed as inputs and gives as output the engine torque. The transmission model inputs the engine torque and transforms the torque based on the selected gear. The differential model proportions the torque from the transmission to the drive wheels. The steering module 112 describes the elastic and geometric properties of the steering system. The suspension module 116 comprises the model of the suspension that may be of four different types: linear spring and damper, nonlinear spring and damper, semiactive suspension, and active suspension. The brake module 108 generates the wheel torques as a function of the driver brake pedal force and brake controller commands.

The external subsystem comprises the environmental module 122, driver module 110, sensor module 100, brake controller module 102, suspension controller module 104, and communication module 106. The environmental module 122 determines the interfaces between the vehicle and the environment. The driver module 110 determines the interface between the driver and the vehicle. This module provides information such as brake pedal force, steering angle, throttle position, and desired gear to the core module. The sensor module 100 models the sensor dynamics. The outputs of this module are sent to the controller module. The brake controller 102 and suspension controller 104 contain algorithms used to control the brake, and the suspension systems. The communication module 106 models communication delays which occur in communication links between controllers.

A vehicle in accordance with an example embodiment of the present invention may be a conventional automobile. In addition, a vehicle may be a truck, an earth mover, a crane, a bulldozer, a tank or any other heavy duty equipment or machinery. A vehicle may also be an airplane, a ship, or a railroad car or other type of passenger or cargo transport vehicle. Any device capable of transporting persons or objects from one location to another in any manner may be considered a vehicle.

Figure 2:
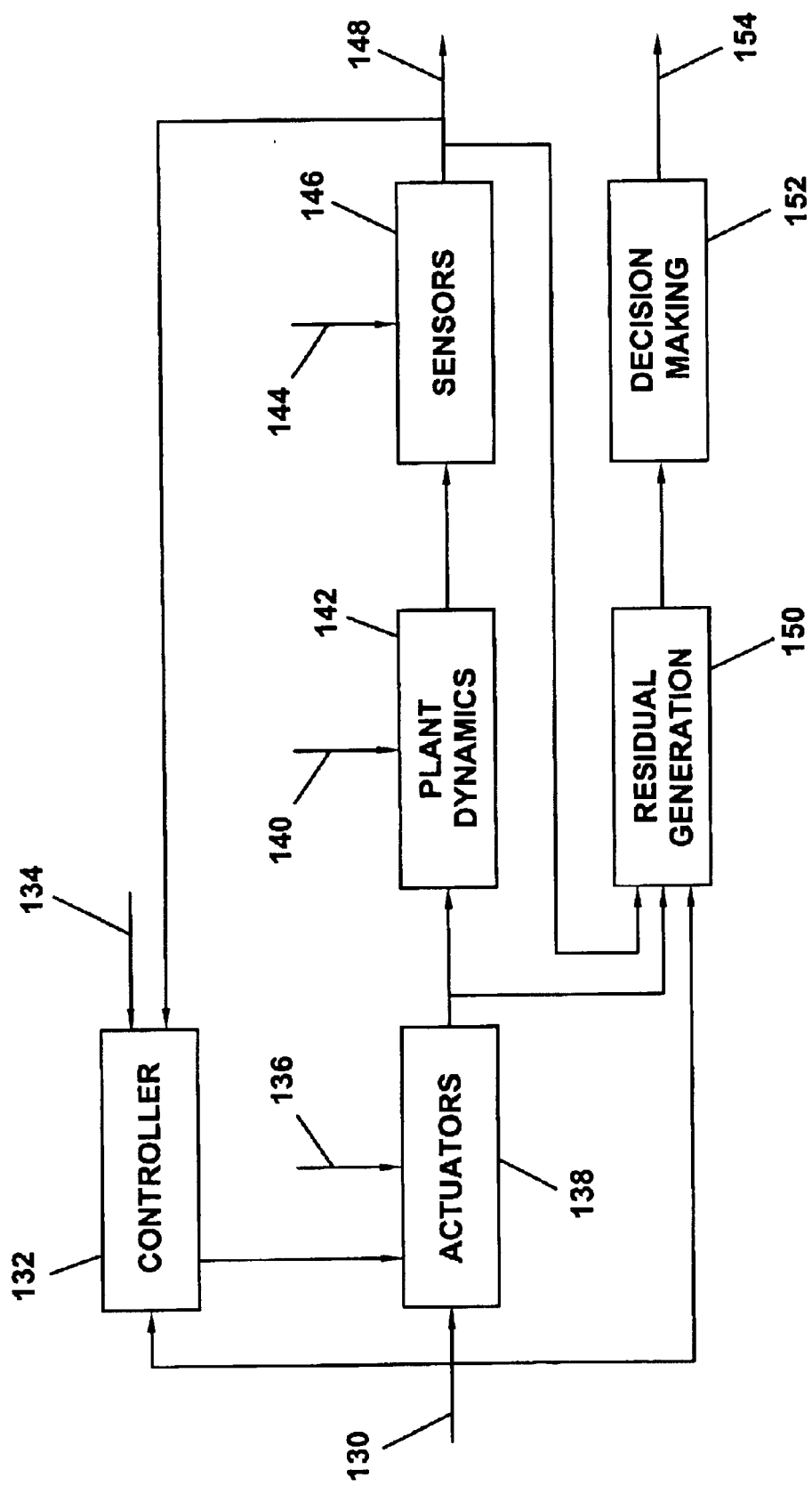
FIG. 2 is a block diagram of the general structure of a prior art model-based FDI method.

In the model-based FDI system and method of the present invention, analytical redundancy is used rather than physical redundancy. This analytical redundancy is contained in the static and dynamic relationship between the input and the output variables of the system. The sensitivity of a diagnostic method to modeling error is one of the key issues in the application of model-based FDI methods. In most cases, prior art model-based FDI methods can be described by the block diagram shown in FIG. 2.

Figure 3:
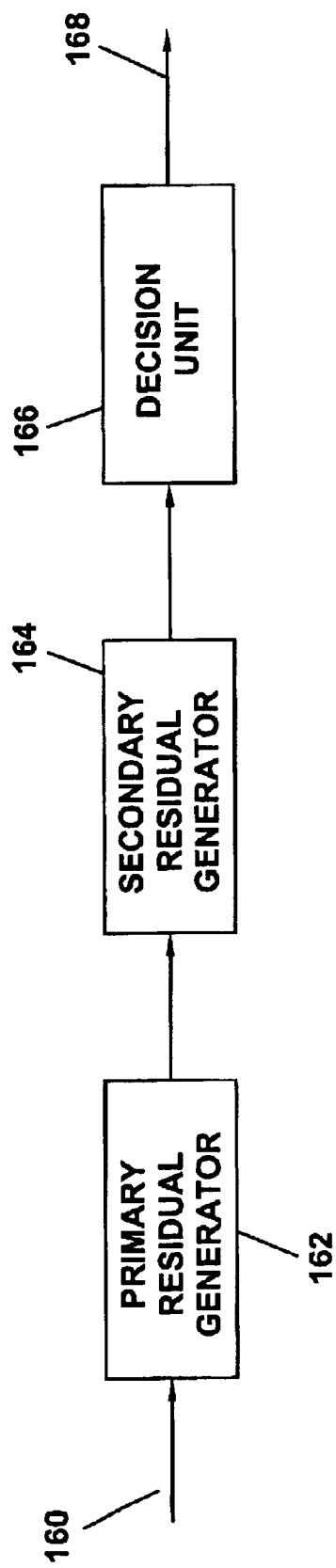
FIG. 3 is a block diagram of a residual generator in accordance with an example embodiment of the present invention.

When an accurate model of the vehicle is available, the general process of the model-based FDI consists of the three stages depicted in FIG. 3. At the first stage, observations 160 acquired through sensor measurements are compared to analytical values of the same variables in a primary residual generator 162. The error between measured and calculated variable is called a primary residual. This residual reflects the system behavior, and has nominal zero mean value under normal conditions. At the second stage, the primary residuals that usually deviate from zero due to noise, modeling error and faults, are communicated to a secondary residual generator 164 and converted in secondary residuals by means of filtering, statistical testing or spectral analysis to obtain signals that can be used to analyze and isolate faults. Finally, the secondary residuals are communicated to a decision maker 166 and analyzed to isolate the fault and a diagnosis 168 or decision is taken.

Figure 4:
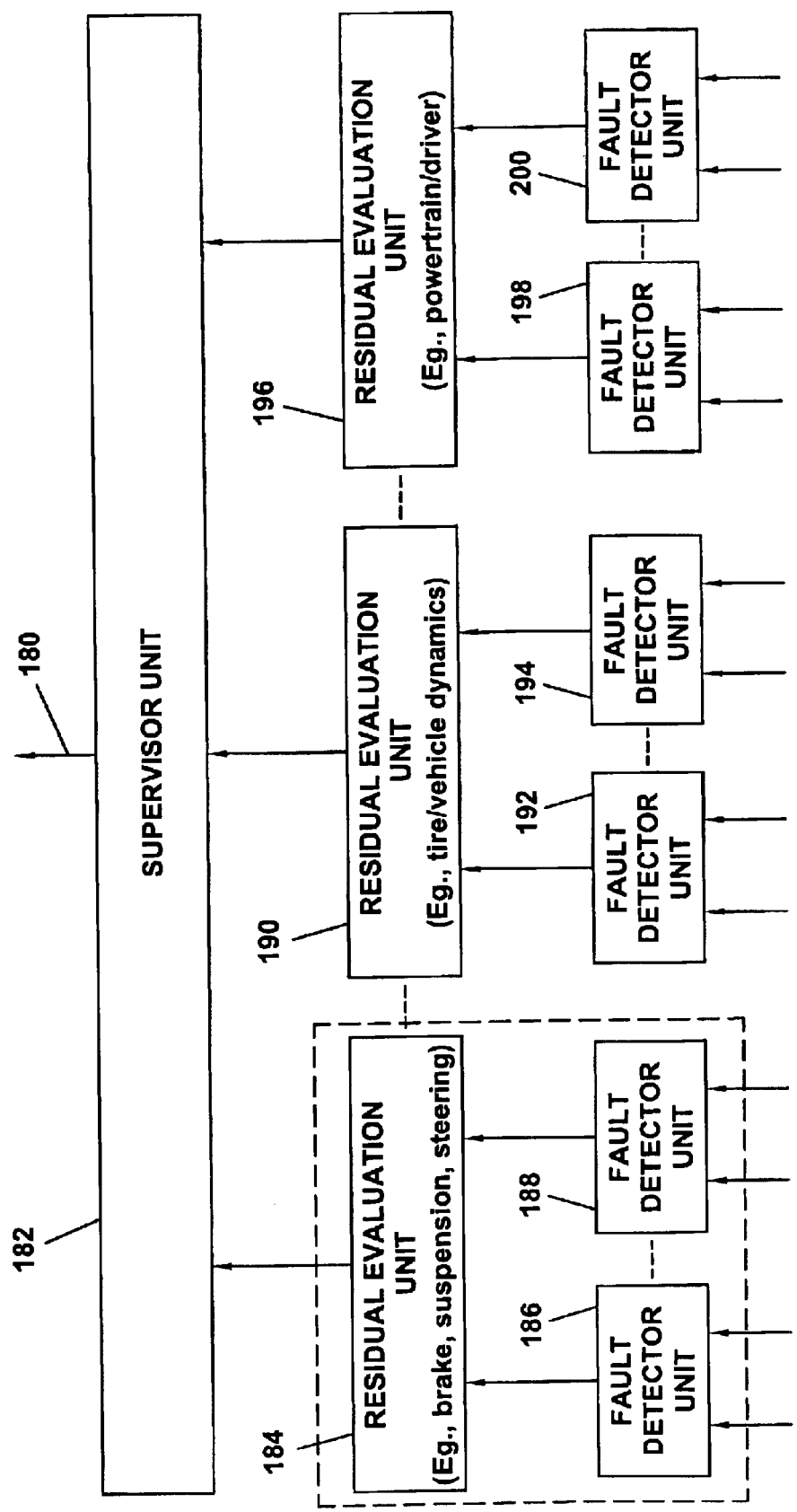
FIG. 4 is a block diagram of a hierarchical diagnostic system in accordance with an example embodiment of the present invention.

In accordance with the present invention, the vehicle system is decomposed into subsystems of smaller dimension containing one or more modules strictly related or interconnected. Referring to FIG. 4, for this structure, the FDI scheme comprises a plurality of fault detector units 186, 188, 192, 194, 198, 200. Each fault detector unit 186, 188, 192, 194, 198, 200 outputs a residual that is sent to a residual evaluation unit 184, 190, 196 that performs the residual evaluation for the selected subsystem comprising the fault detector units. Finally, each subsystem that reports to a residual evaluation unit 184, 190, 196 outputs a decision that is sent to a supervisor unit or fault detector 182 performing the final diagnosis 180. As shown in FIG. 4, some different subsystems for the vehicle are shown and each is constituted by a residual evaluation unit 184, 190, 196 and a plurality of fault detector units 186, 188, 192, 194, 198, 200.

Figure 5:
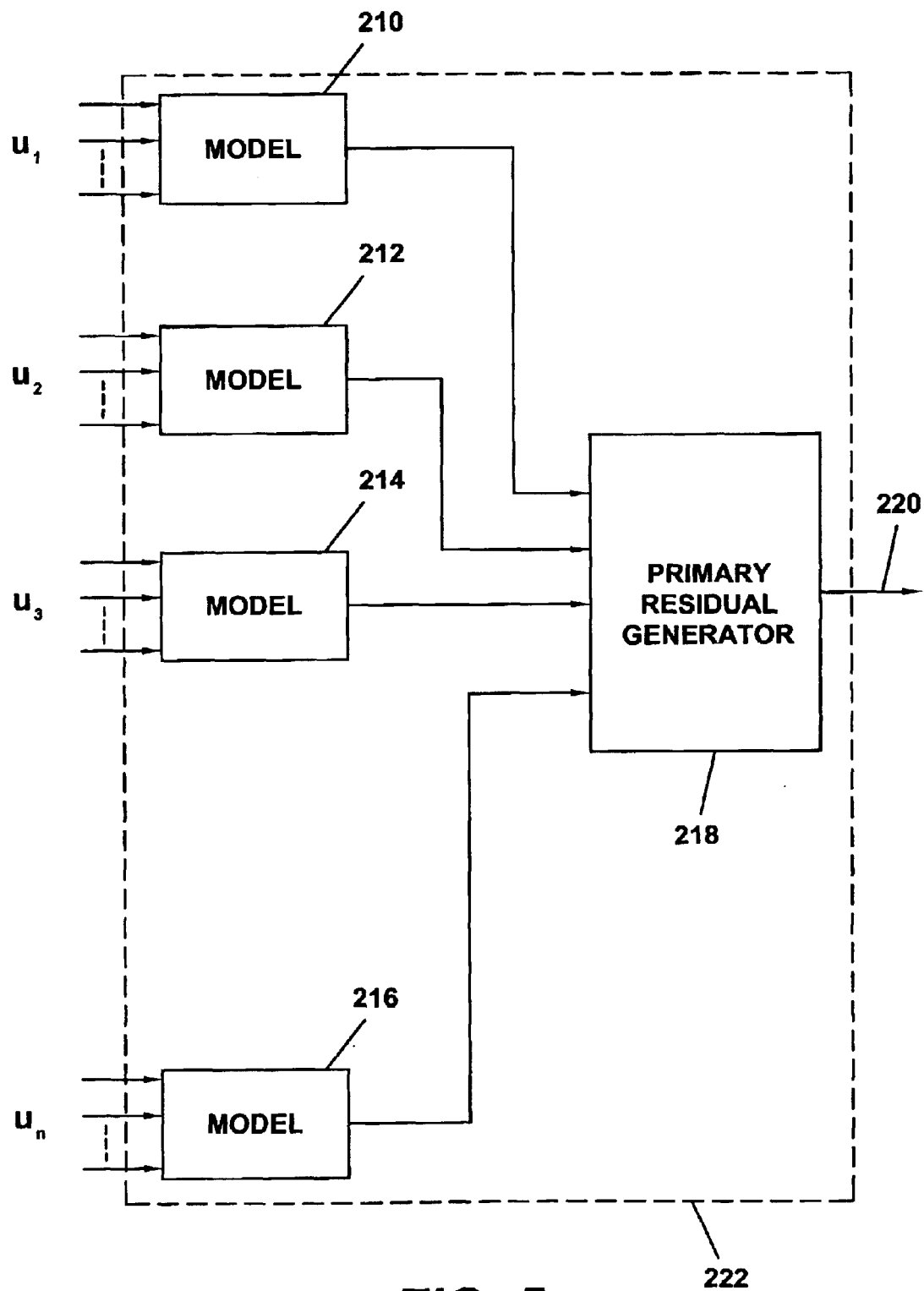
FIG. 5 is a block diagram for the structure of a fault detector unit in accordance with an example embodiment of the present invention.

The scheme for a fault detector unit 222 is depicted in FIG. 5. Each fault detector unit 222 may comprise a plurality of models 210, 212, 214, 216 and a primary residual generator 218 that sends output to a residual evaluation unit 220.

Figure 6:
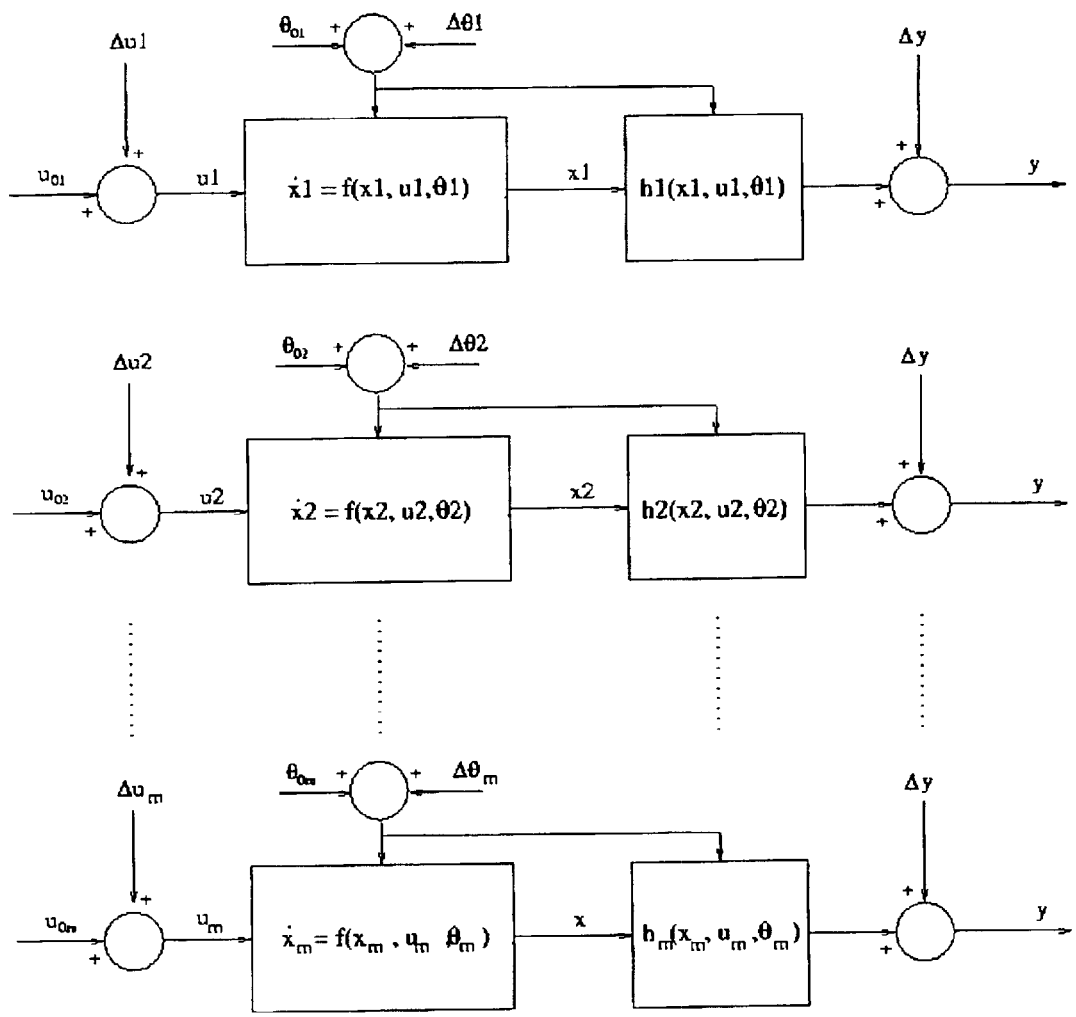
FIG. 6 is a block diagram of a general module in accordance with an example embodiment of the present invention.

In general, a module may be represented as in FIG. 6 where:

$u_{0i}$, i=1 ... m are the input vectors
$\Delta u_i$, i=1 ... m are the input fault vectors
$\theta_{0i}$, i=1 ... m are the nominal parameter vectors
$\Delta \theta_l$, l=1 ... m are the parameter fault vectors
$x_i$, i=1 ... m are the state vectors
$\Delta y$ is the output fault vector
$y$ is the output measured vector.

The module can be described by the following equations $$\begin{cases} \dot{x}_l = f_l(x_l, u_l, \theta_l) \\ y = h_l(x_l, u_l, \theta_l) + \Delta y \end{cases}, x_1 \in \Gamma_1 \qquad (1)$$

$$\vdots$$

$$\begin{cases} \dot{x}_m = f_m(x_m, u_m, \theta_m) \\ y = h_m(x_m, u_m, \theta_m) + \Delta y \end{cases}, x_m \in \Gamma_m$$

with $u_{0i}=u_{0i}+\Delta u_i$, $\theta_i=\theta_{0i}+\Delta \theta_i$, i=1 ... m, and where $\Gamma_i$ is a subset in which the $i^{th}$ model equations are valid. A fault detector unit is associated with each module. Each fault detector unit contains a multimodel representation of the type $$\begin{cases} \dot{\hat{x}}_l = g_l(\hat{x}_l, u_l, \hat{\theta}_l, y) \\ \hat{y}_1 = h_l(\hat{x}_l, u_l, \hat{\theta}_l) \end{cases}, \hat{x}_1 \in \Gamma_1 \qquad (2)$$

$$\vdots$$

$$\begin{cases} \dot{\hat{x}}_m = g_m(x_m, u_m, \hat{\theta}_m, y) \\ \hat{y}_m = h_m(\hat{x}_m, u_m, \hat{\theta}_m) \end{cases}, \hat{x}_m \in \Gamma_m$$

characterized by the fact that, without any fault, the following conditions hold $$\hat{x}_l \rightarrow x_l \text{ for } l \rightarrow \infty, i=1 \ldots n \qquad (3)$$

Figure 7:
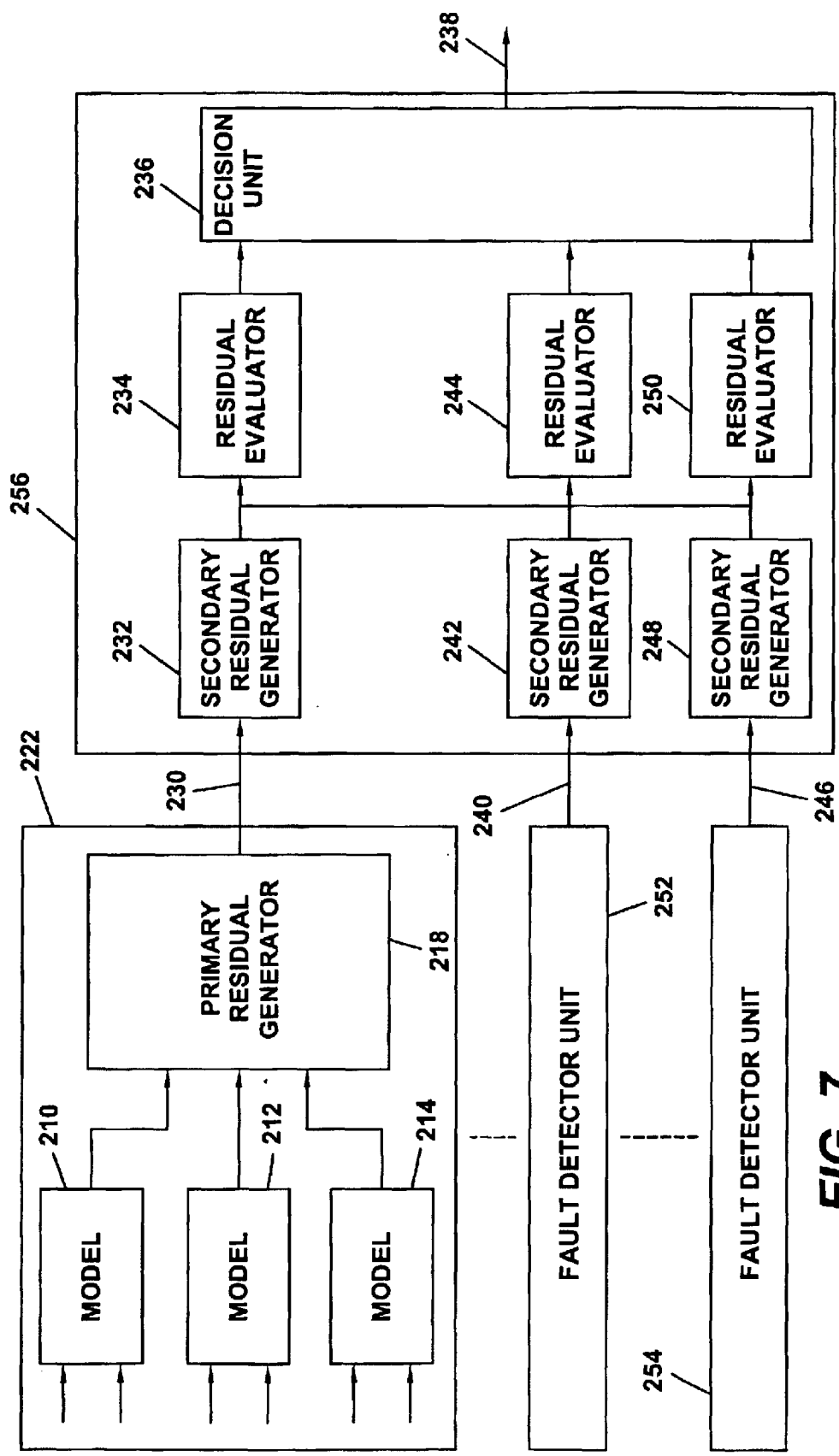
FIG. 7 is a block diagram of a fault detection and isolation unit in accordance with an example embodiment of the present invention.

Referring to FIG. 7, each fault detector unit 222, 252, 254 comprising a plurality of models 210, 212, 214 and primary residual generator 218 that generates the primary residuals 230, 240, 246 that are sent to the decision unit 236 as shown in FIG. 7. This decision unit 236 may be a component of a residual evaluation unit 256 comprising secondary residual generators 232, 242, 248 and residual evaluators 234, 244, 250. The residual evaluations for the subsystem are performed at the residual evaluation units 234, 244, 250 and the result from the decision unit 236 is sent as input to the supervisor unit 238.

The method of the FDI scheme of the present invention comprises the following steps:

1. Partition of the vehicle model into subsystems containing one or more interconnected modules. The same module may appear in more then one subsystem, but the set of all subsystems, in general, does not have to contain all the modules.

2. Associate a fault detector unit to each module or smaller partition of modules and define a multimodel representation and selection of a residual generation method for every subsystem. The method for residual generation may be of different type, but commonly used approaches are the parity space method, the observer method, and the parameter identification method.
3. Define an appropriate residual evaluation method for each subsystem.

During operation of the vehicle, data received at the fault detector units is processed and passed to the appropriate residual evaluation unit. A supervisor unit receives data from the residual evaluation units and diagnoses problems with the vehicle.

To illustrate the method for a specific case, consider the subproblem of fault detection for three important sensors:
- the lateral acceleration sensor;
- the steering wheel angle sensor;
- the yaw rate sensor;

and for two parameters:
- the front cornering stiffness; and
- the rear cornering stiffness.

Figure 8:
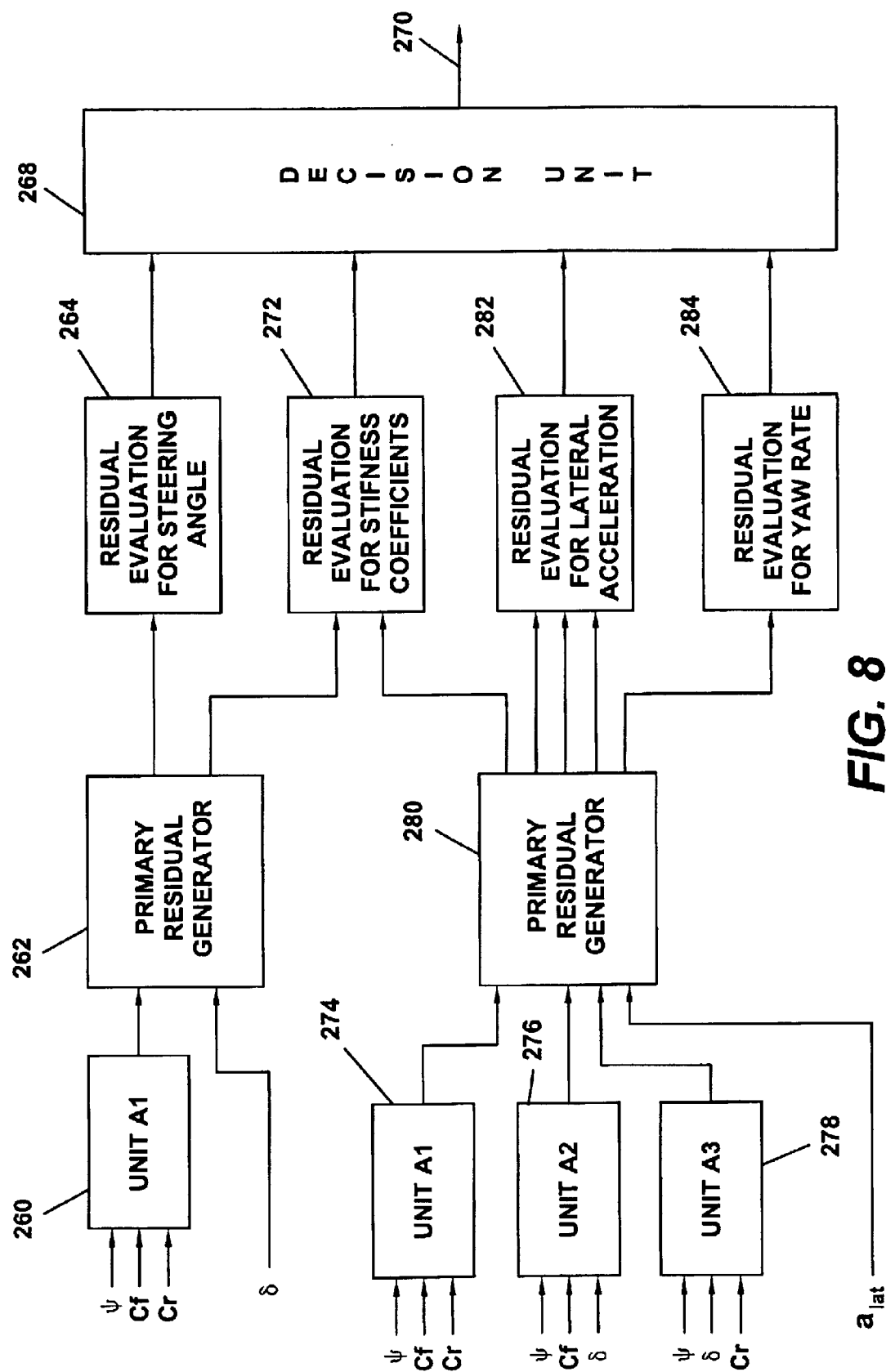
FIG. 8 is a block diagram of the FDI scheme of the present invention.

The structure of this example FDI scheme is shown in FIG. 8. One fault detector unit 260 is connected to a first primary residual generator 262 that connects to two residual evaluation units 264, 212. Three additional fault detector units 274, 276, 278 are connected to a second primary residual generator 280 that connects to three residual evaluation units 264, 272, 282, 284. Each residual evaluation unit 264, 272, 282, 284 connects to a decision unit 268 that provides output to a supervisor unit 279.

The FDI scheme of FIG. 8 shows a fault detector unit where only one multimodel representation for a simplified front wheel steered, small angle, bicycle model structure is considered. The dependence of the vehicle lateral velocity and yaw rate and the longitudinal velocity on the steering input is modeled. A simplified tire force model is adopted, whereby the lateral forces of the front and rear tires are linearly related to the front and rear slip angles, through Cf and Cr the front and rear cornering stiffness. The model is valid for nonsevere maneuvers, (i.e., for $a_{lat} \leq 0.2$ g, where g is the acceleration due to gravity). The nonlinear model can be described by the equations $$\begin{cases} \dot{v}_x = \frac{F_x}{M} + v_y \dot{\psi} \\ \dot{v}_y = -\frac{2}{M}(C_f + C_r)\frac{v_y}{v_x} - \frac{2}{M}(aC_f - bC_r)\frac{\dot{\psi}}{v_x} - v_x\dot{\psi} + \frac{2C_f}{MG}\delta \\ \ddot{\psi} = -\frac{2}{I}(aC_f - bC_r)\frac{v_y}{v_x} - \frac{2}{I}(a^2C_f + b^2C_r)\frac{\dot{\psi}}{v_x} + \frac{2aC_f}{IG}\delta \end{cases} \quad (4)$$

a is the distance from front wheel to C.G. of the vehicle
b is the distance from rear wheel to C.G. of the vehicle
$C_f$ is the front cornering stiffness
$C_r$ is the rear cornering stiffness
M is the vehicle mass
I is the vehicle moment of inertia
G is the gear ratio
$F_x$ is the longitudinal force
$v_x$ is the vehicle longitudinal velocity
$v_y$ is the vehicle lateral velocity
$\delta$ is the steering angle
$\Psi$ is the yaw rate For this model, it is possible to design the following sliding mode nonlinear observer based only on the yaw rate measurement $$\dot{\hat{x}} = \left(\frac{\partial H(\hat{x})}{\partial \hat{x}}\right)^{-1} M(\hat{x}) sign(V(t) - H(\hat{x})) + B\delta \quad (5)$$

where
$H(x) = [h_1(x)\ h_2(x)\ h_3(x)]$
$h_1(x) = \psi = r$
$h_2(x) = \dot{r}$
$h_3(x) = \ddot{r}$
$\gamma(t) = [v_1(t)\ v_2(t)\ v_3(t)]$
$v_1(t) = r(t)$
$v_{i+1} = (m_i((x))sign\ (x(v_i(t) - h_i(\hat{x}(t))))_{eq}$, $i=1,2$
$M(\hat{x}) = diag\ (m_1(\hat{x})\ m_2(\hat{x})\ m_3(\hat{x}))$ The following table shows the error signatures.

TABLE 1

| | | Error Signature | |
|---|---|---|---|
| no. | fault variable | cause | resid. pattern |
| 1 | wheel steering angle $\delta$ | actuator failure | [1 0 1 0 1 1 1] |
| 2 | lateral accel $a_{lat}$ | sensor failure | [1 0 1 0 1 1 0] |
| 3 | yaw rate r | sensor failure | [1 1 1 1 1 1 1] |
| 4 | Cf front cornering stiffness | blow out/ incorrect inflat. | [0 1 0 1 1 1] |
| 5 | Cr rear cornering stiffness | blow out/ incorrect inflat. | [1 1 1 1 0 1] |

To simplify the problem, consider only the case of single faults. The residual vector is $$R = [a_{lat} - \hat{a}_{y1}\delta - \delta a_{lat} - \hat{a}_{y2}C_f - \hat{C}_f a_{lat} - \hat{a}_{y3}C_r - \hat{C}_r] \quad (6)$$

With the choice made above, the error signature described in the Table 1 may be derived.

Some simulation and experimental results obtained from the previous FDI scheme using sliding mode observers illustrate the system and method of the present invention. The tests are carried out for a vehicle with the parameter data set as in table 2.

TABLE 2

| Parameter Values Utilized in the Steering Model. | |
|---|---|
| parameter | value |
| a | 1.0 [m] |
| b | 1.69 [m] |
| Cf | 60530 [N/rad] |
| Cr | 64656 [N/rad] |
| M | 1651 [Kg] |
| I | 2755 [Kg/m 2] |
| G | 1 |
| Fx | 100 [N] |

Figure 9:
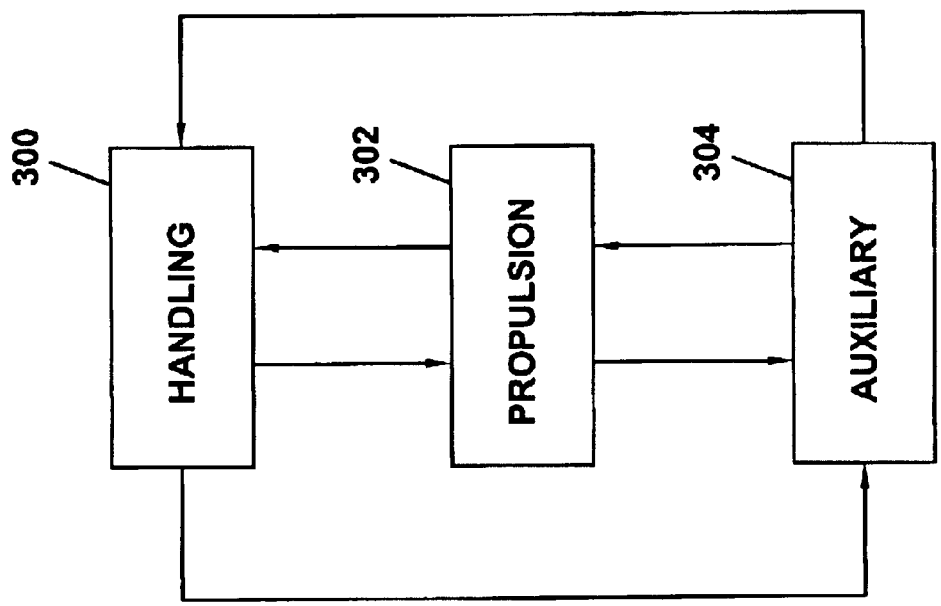
FIG. 9 is a block diagram of the primary systems of a vehicle for an example embodiment of the present invention.

Although the present invention as has been described in accordance with a vehicle handling system, the present invention may be used in conjunction with types of other vehicle or machinery systems. Referring to FIG. 9, vehicles of many different types may comprise a handling system 300, a propulsion system 302, and an auxiliary system 304, each of which may comprise a plurality of modules associated with one or more fault detector units that are connected to residual evaluation units and supervisor units. Data may be exchanged between modules in each system to provide for optimal vehicle performance.

Figure 10:
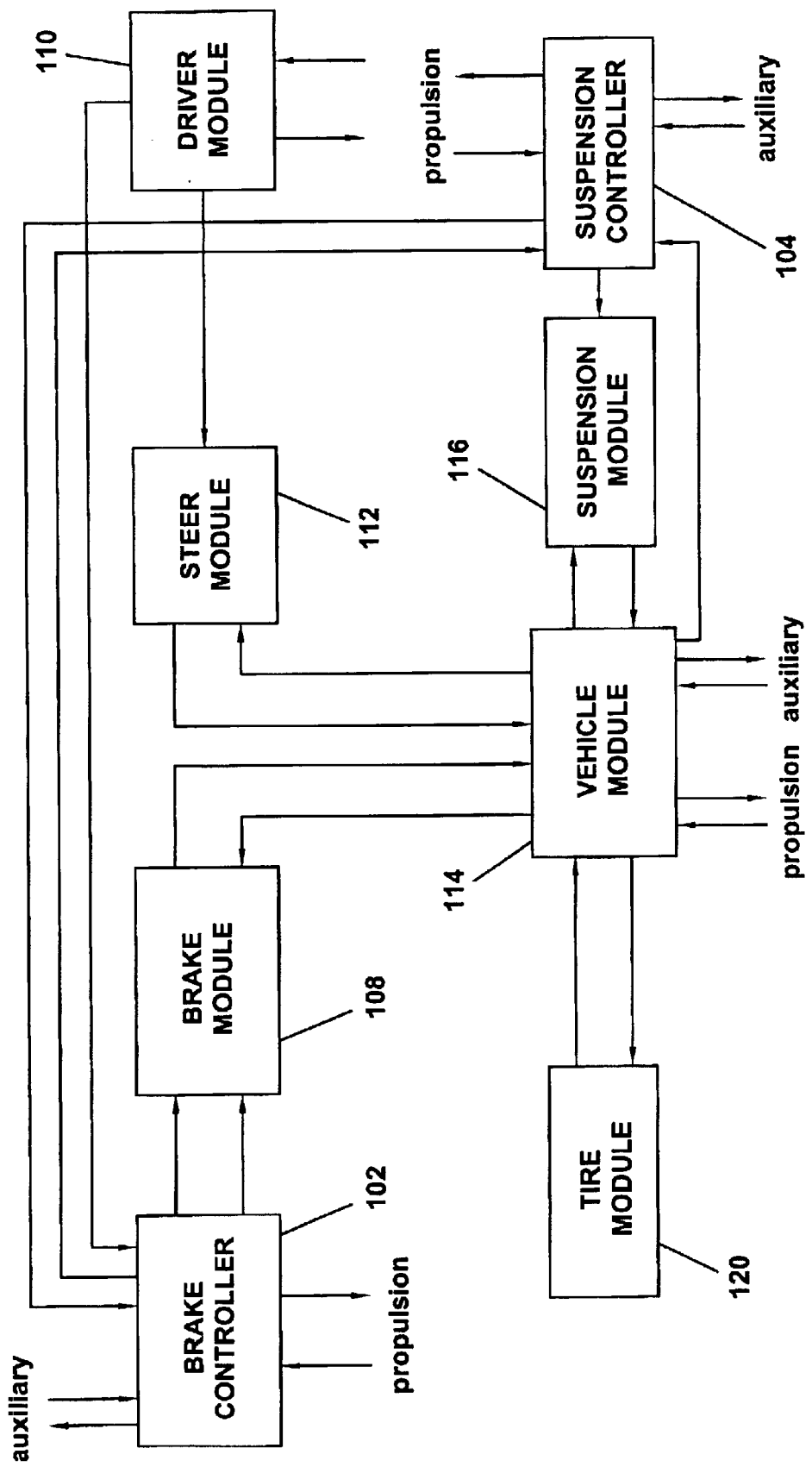
FIG. 10 is a block diagram of the primary components for a handling system for an example embodiment of the present invention.
Figure 11:
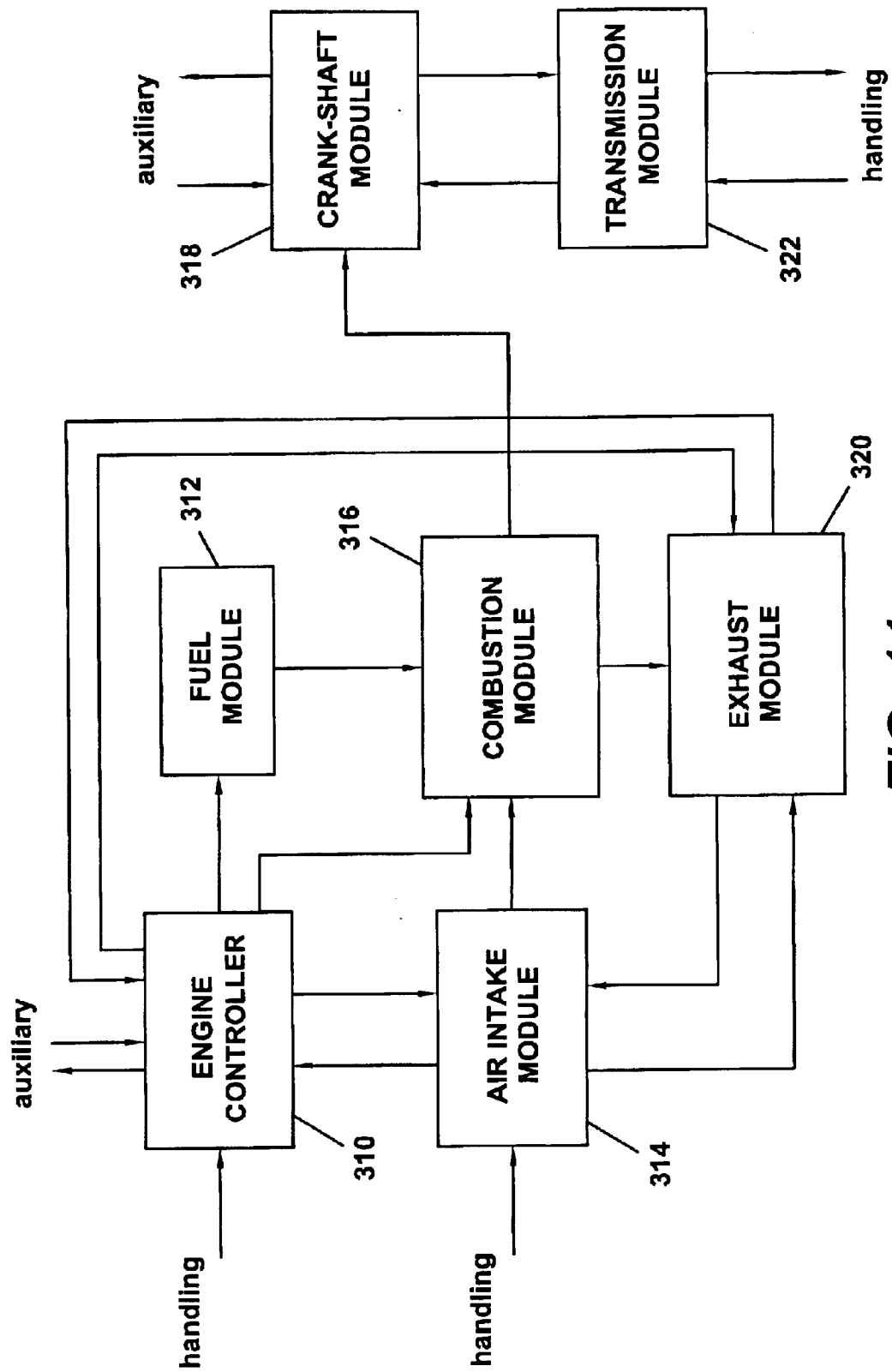
FIG. 11 is a block diagram of the primary components for a propulsion system for an example embodiment of the present invention.

Referring to FIG. 10, a handling system in a vehicle may comprise a brake controller module 102, a brake module 108, a steering module 112, a driver module 110, a tire module 120, a vehicle module 114, a suspension module 116, and a suspension controller module 104. As shown in FIG. 11, modules in the handling system may communicate with modules in the auxiliary and propulsion systems.

Referring to FIG. 11, a propulsion system in a vehicle may comprise an engine controller module 310, a fuel module 312, an air intake module 314, a combustion module 316, a crank-shaft module 318, an exhaust module 320, and a transmission module 322. The modules in the propulsion system may communicate with modules in the handling and auxiliary systems.

Figure 12:
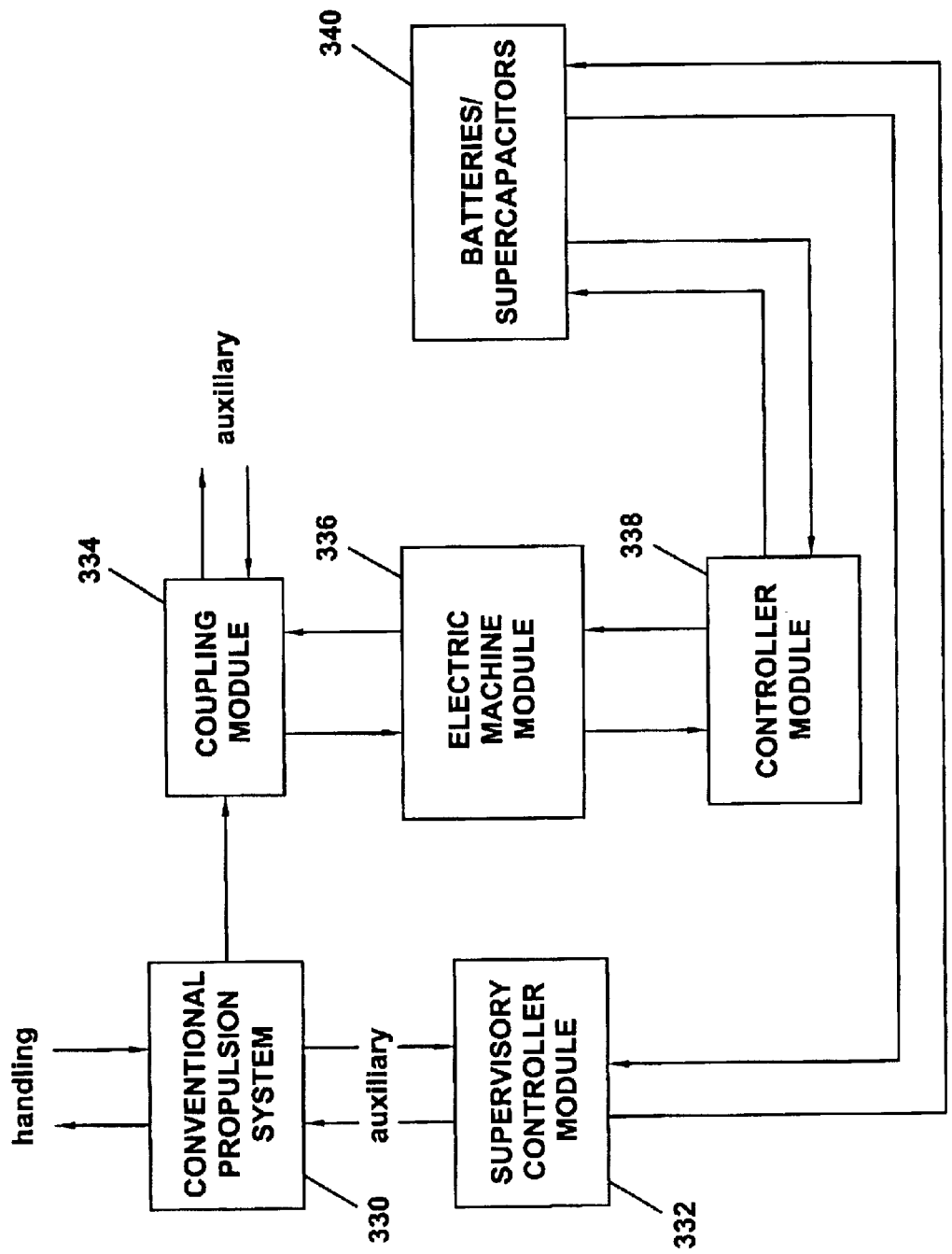
FIG. 12 is a block diagram of the primary components for a hybrid propulsion system for an example embodiment of the present invention.

Referring to FIG. 12, a hybrid propulsion system may comprise a conventional propulsion system 330 as well as a supervisory controller module 332, a coupling module 334, an electric machine module 336, a controller module 338, and batteries/supercapacitors 340. The modules in the hybrid propulsion system may communicate with modules in the handling and auxiliary systems.

Figure 13:
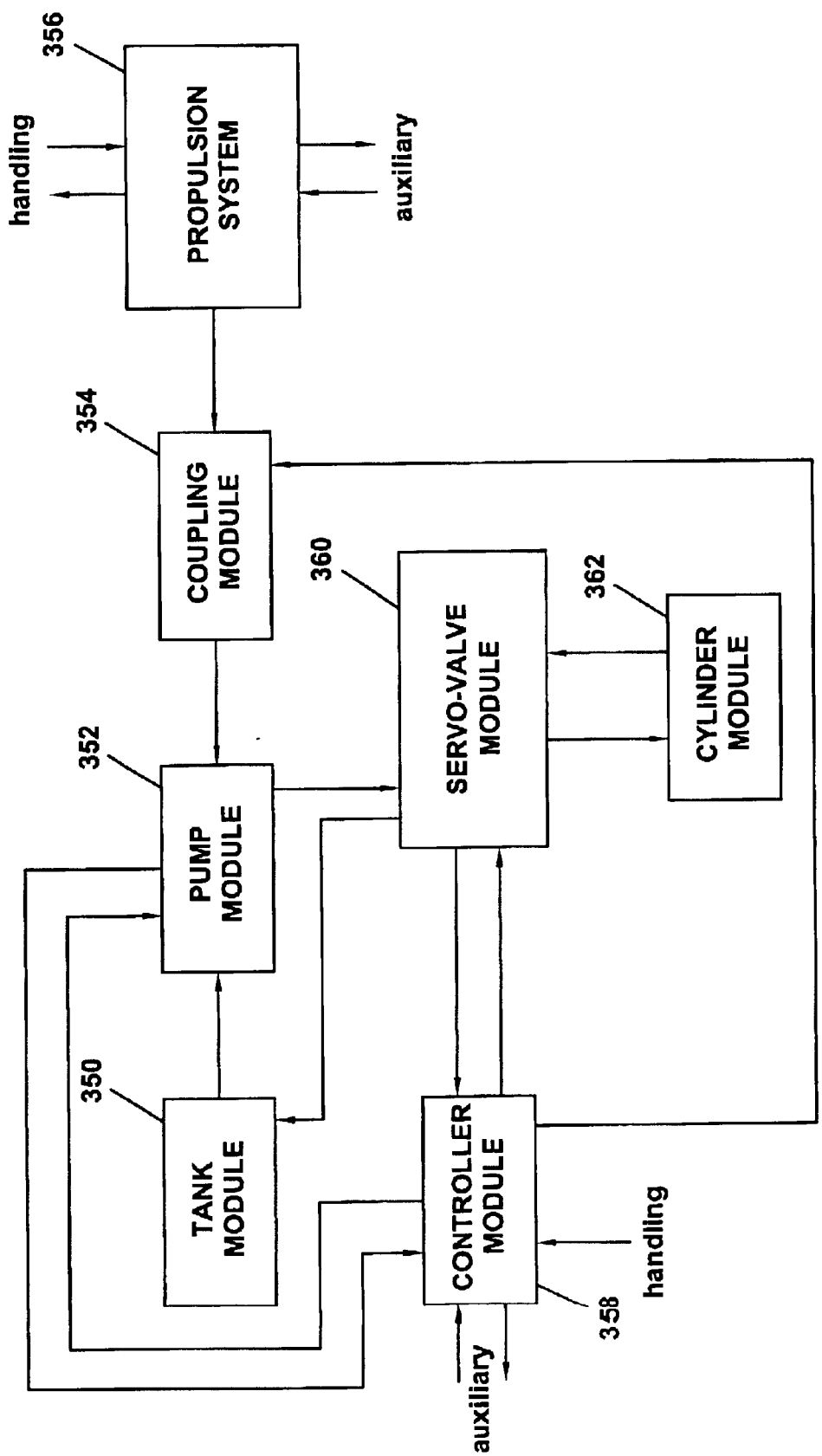
FIG. 13 is a block diagram of the primary components for a hydraulic machinery example embodiment of the present invention.

Referring to FIG. 13, in a hydraulic machinery example embodiment of the present invention, a tank module 350, a pump module 352, a coupling module 354 in communication with a propulsion system 356, a controller module 358, a servo-valve module 360, and a cylinder module 362. The hydraulic machinery modules may communicate with modules in the handling and auxiliary systems.

Figure 14:
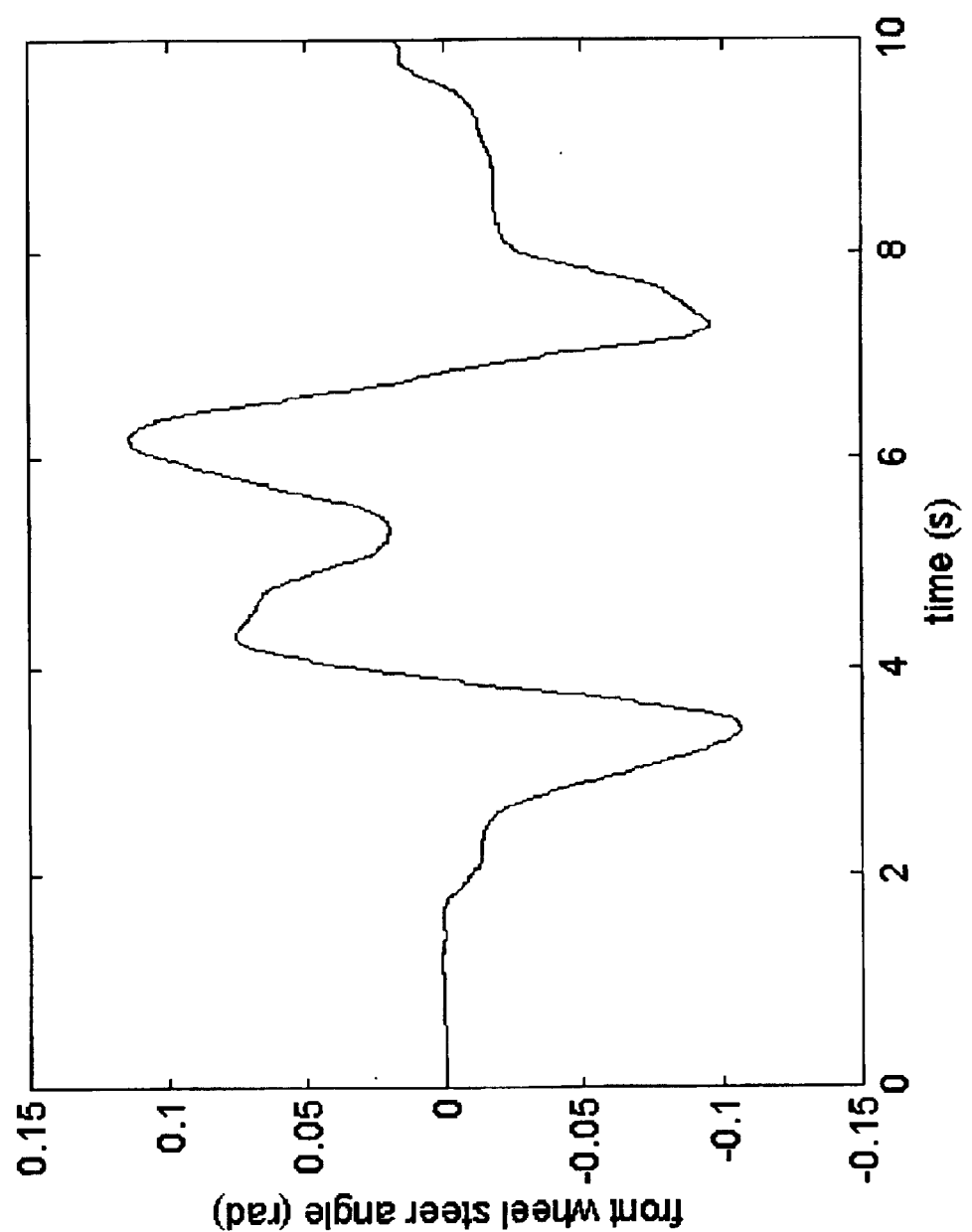
FIG. 14 is a graph of steering wheel angle input.

Referring to FIG. 14, the steering input for a vehicle lane change maneuver at a longitudinal velocity of 25-mph (11 m/s) and without any fault is shown.

Figure 15:
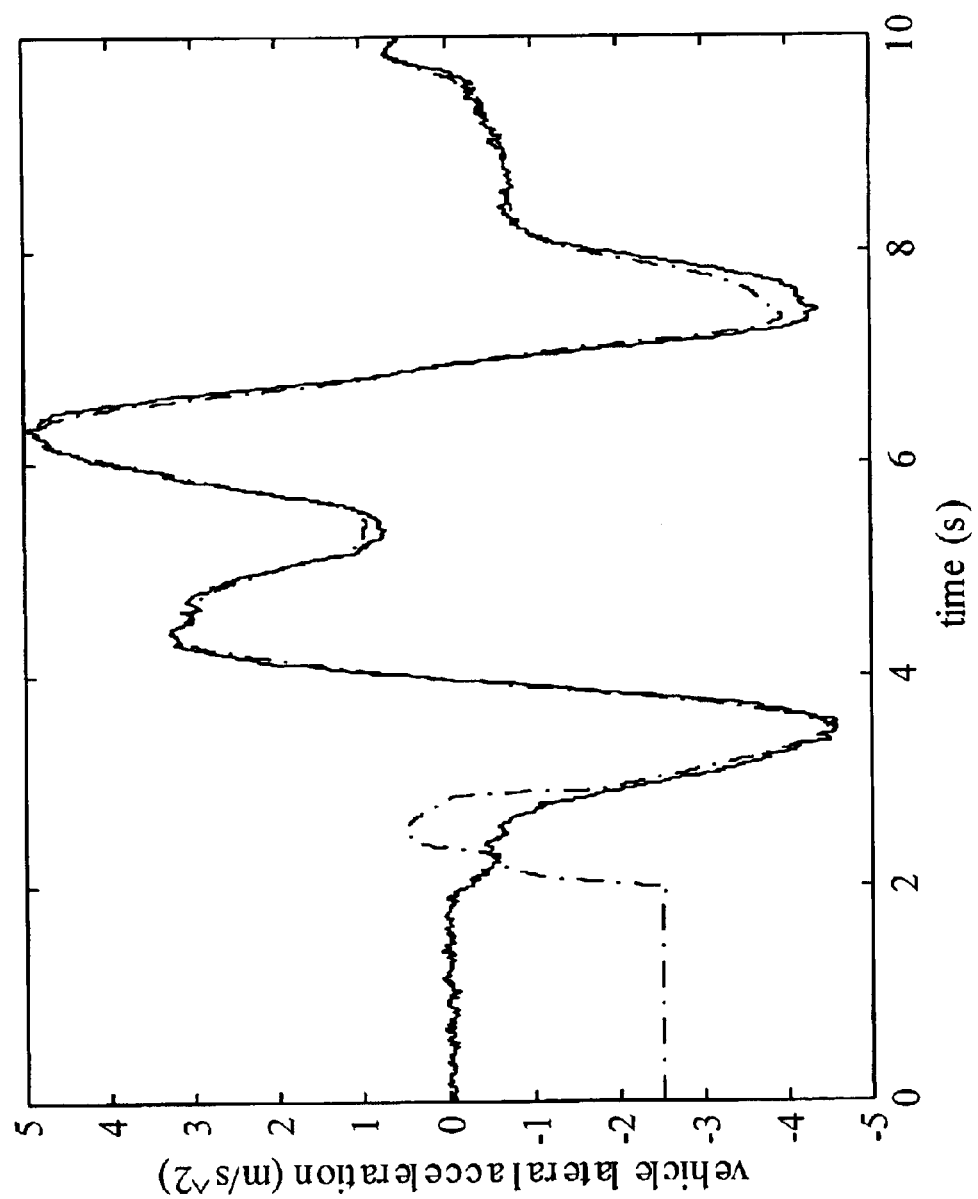
FIGS. 15–17 are graphs of estimated and actual state variables.
Figure 16:
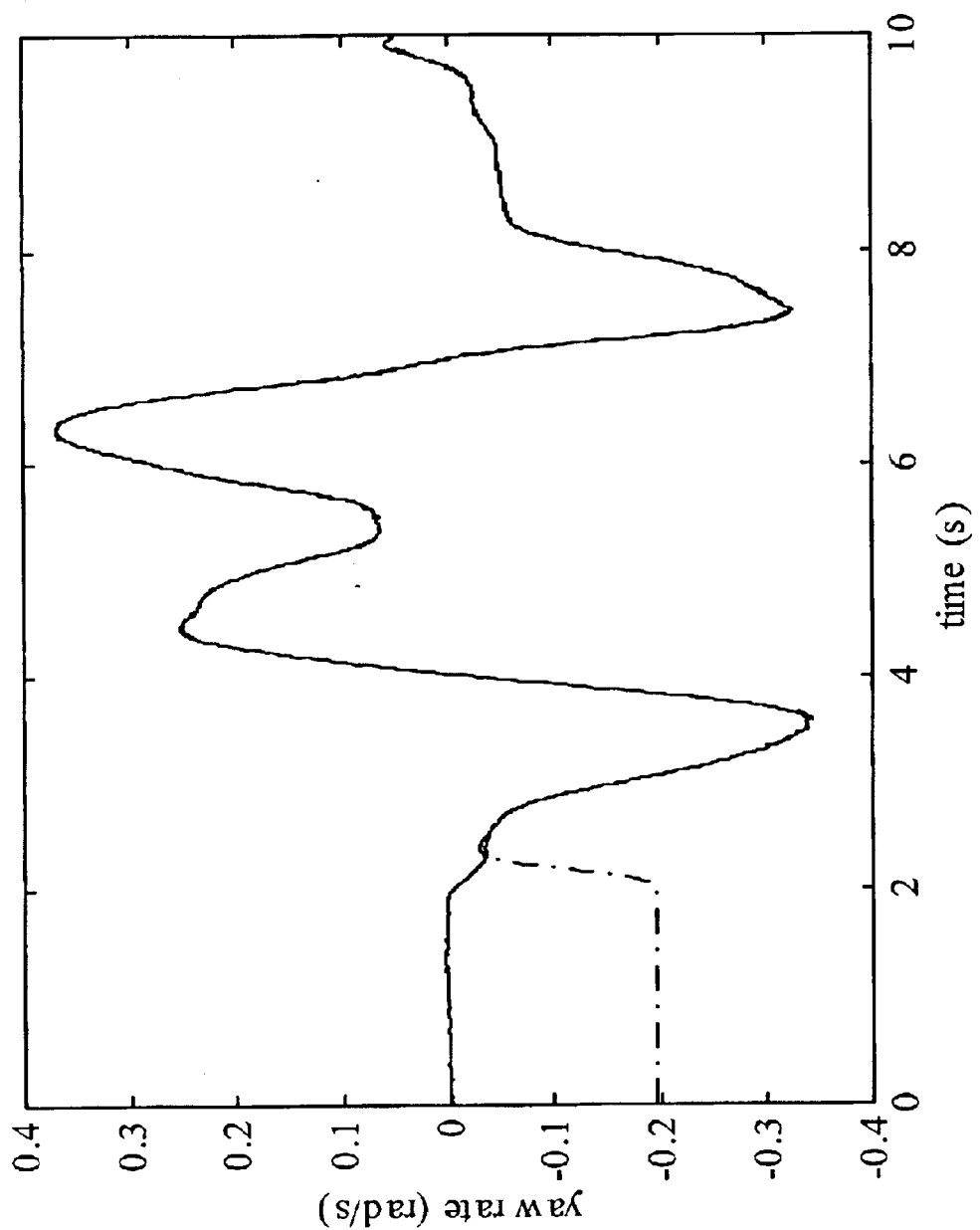
Figure 17:
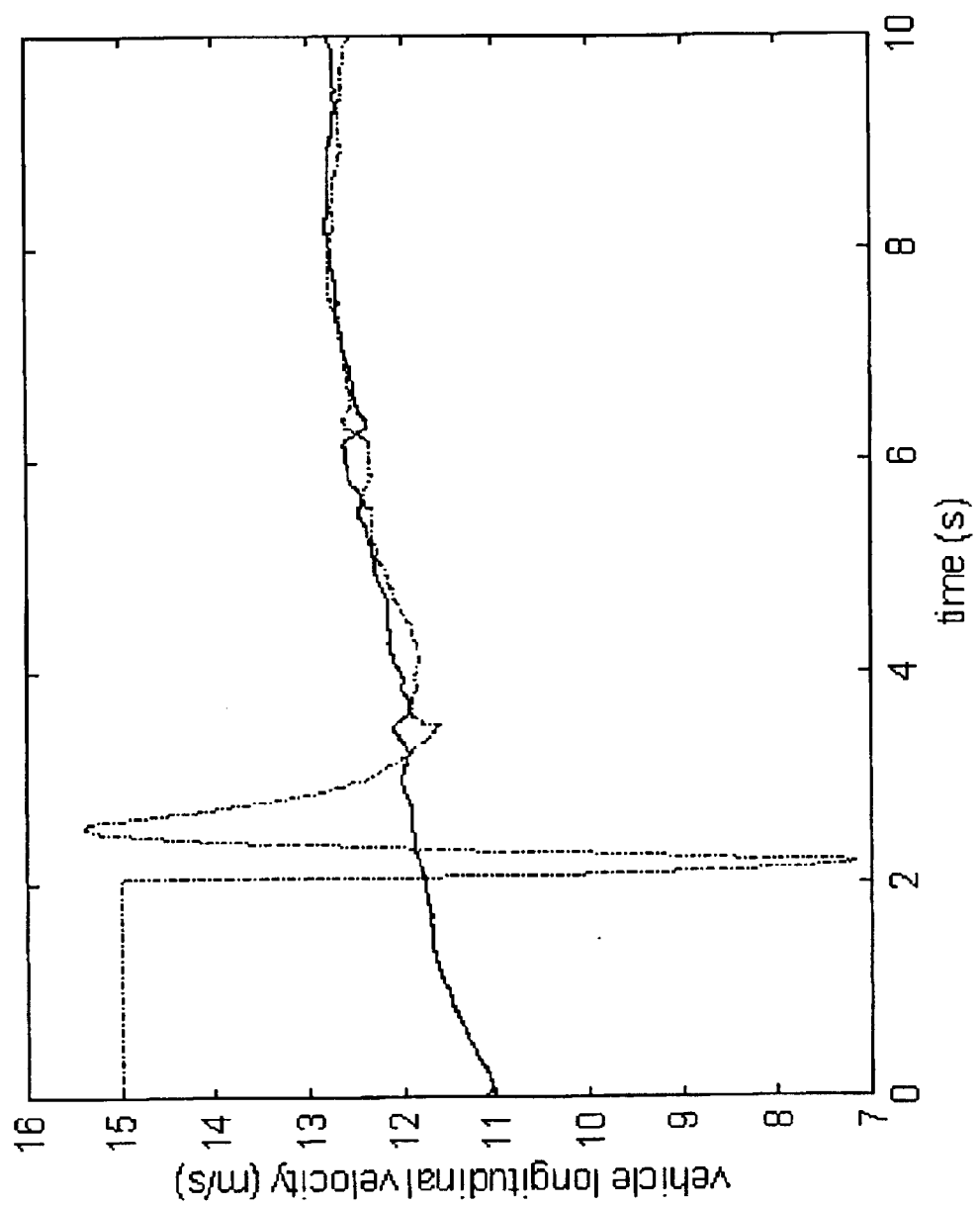

The relative state variable estimations (dashed line) are represented in FIGS. 15–17. It is possible to notice that, after a fast transient, the estimates track the true variable with a very small error.

Figure 18:
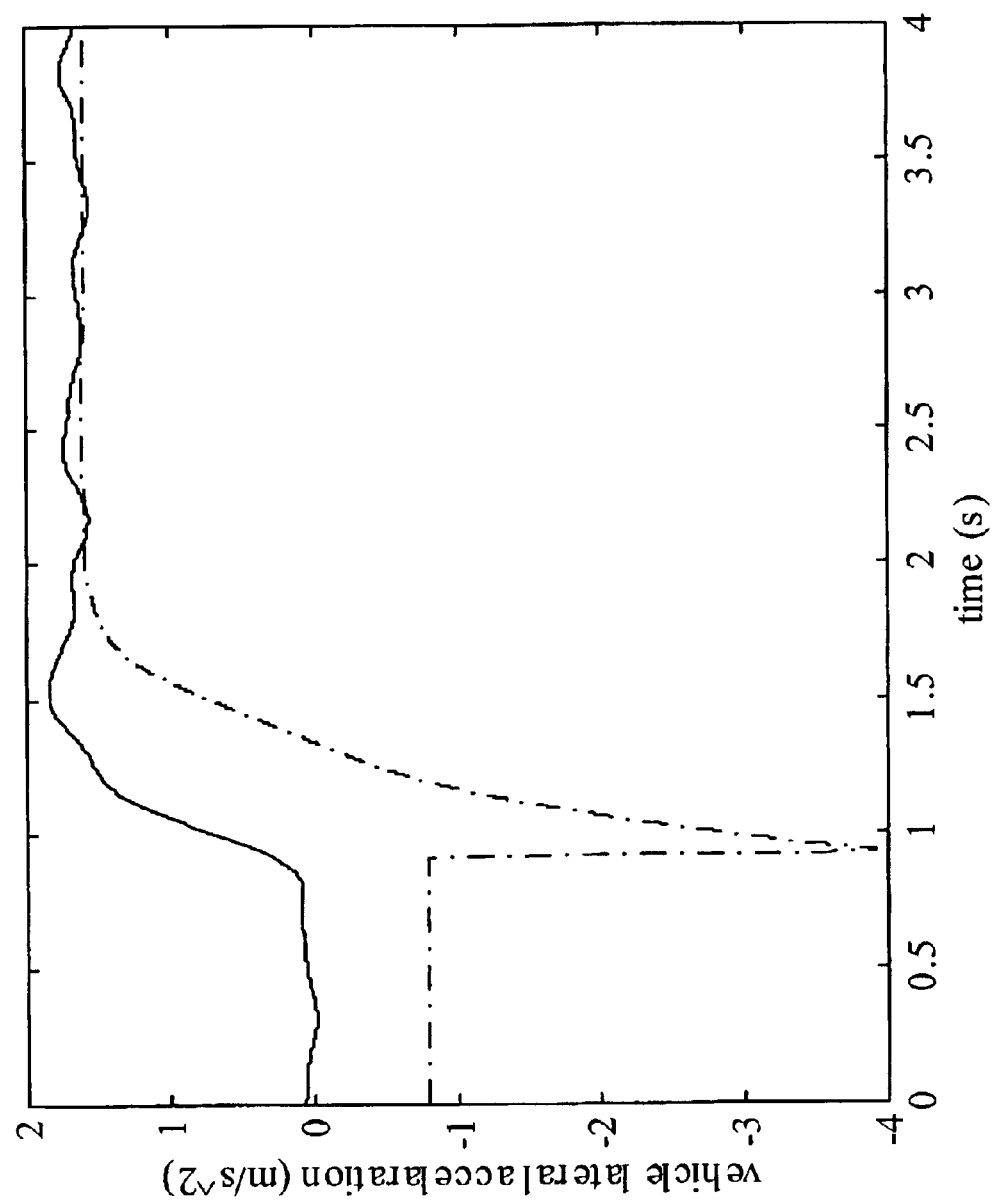
FIGS. 18–23 are graphs of experimental results for a J-turn.
Figure 19:
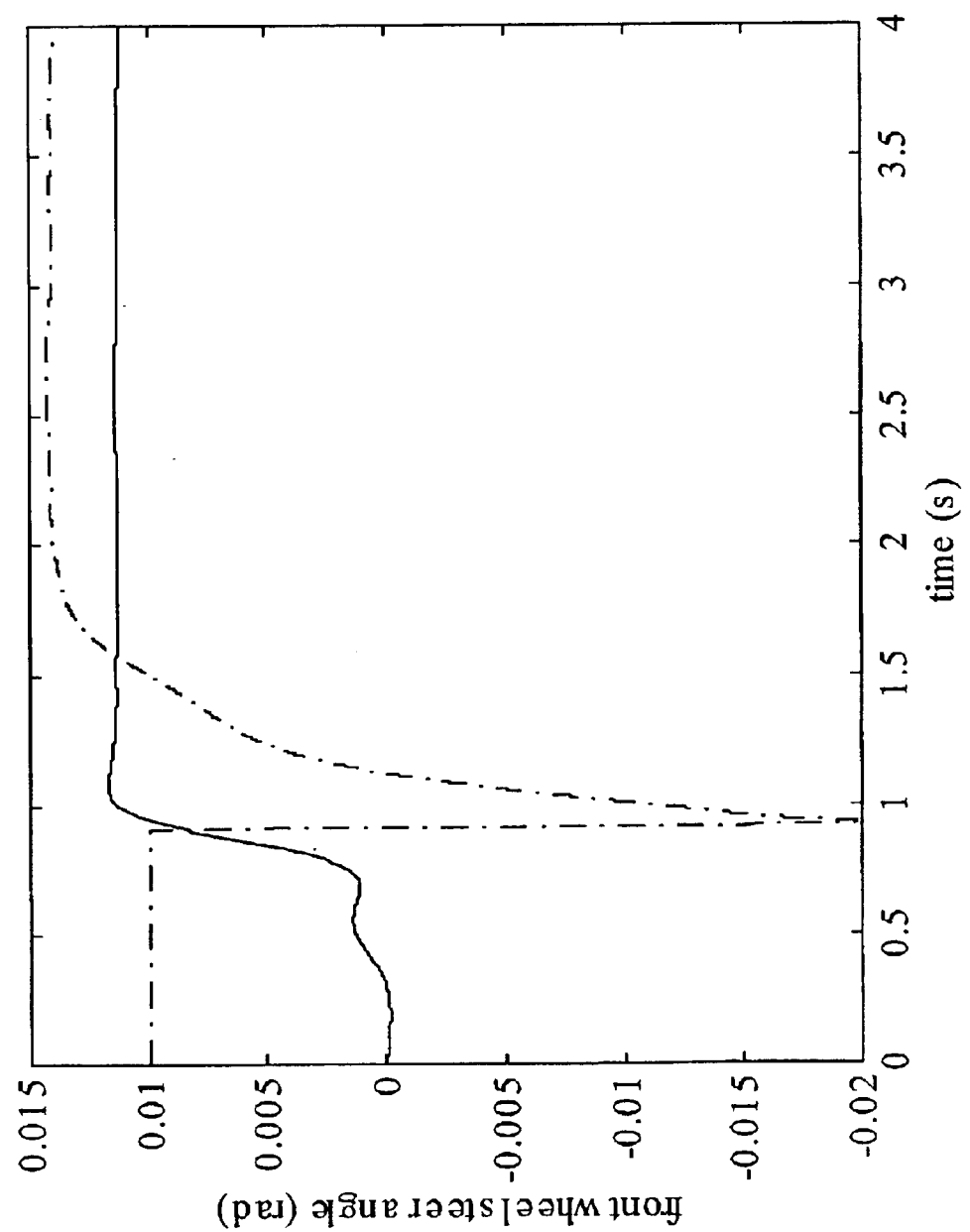

In FIGS. 18–23, the experimental results for a Jturn at constant forward velocity and step change in the steering angle are presented. A steering input fault of 1.25 times the commanded input has been applied during the test. FIGS. 18 and 19 show the residuals for lateral acceleration and steering angle respectively obtained from Unit A1. In dashed line are indicated the estimate values from the observer, a flag 0 (threshold evaluation) may be associated to the lateral acceleration residual while a flag 1 is associated to steering angle residual.

Figure 20:
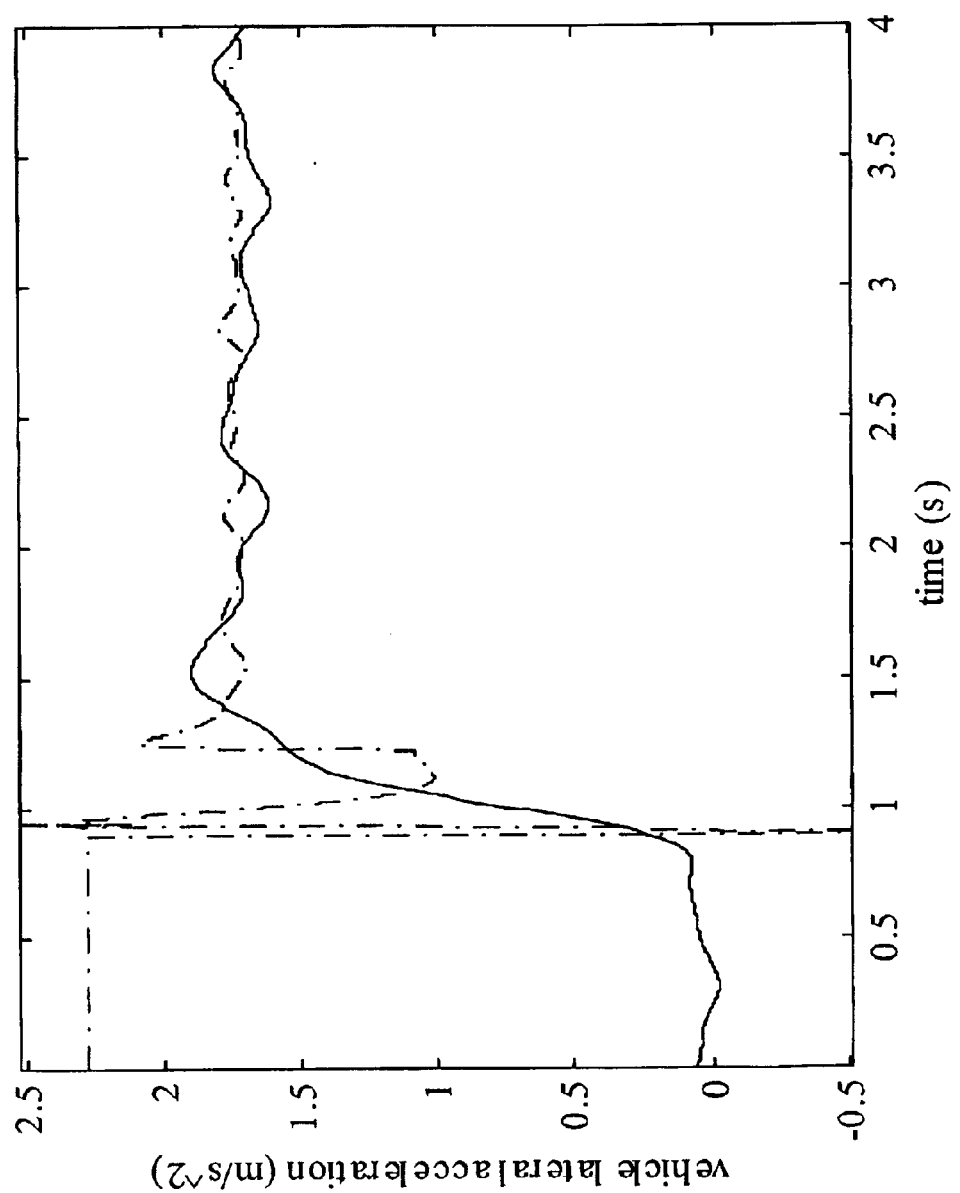
Figure 21:
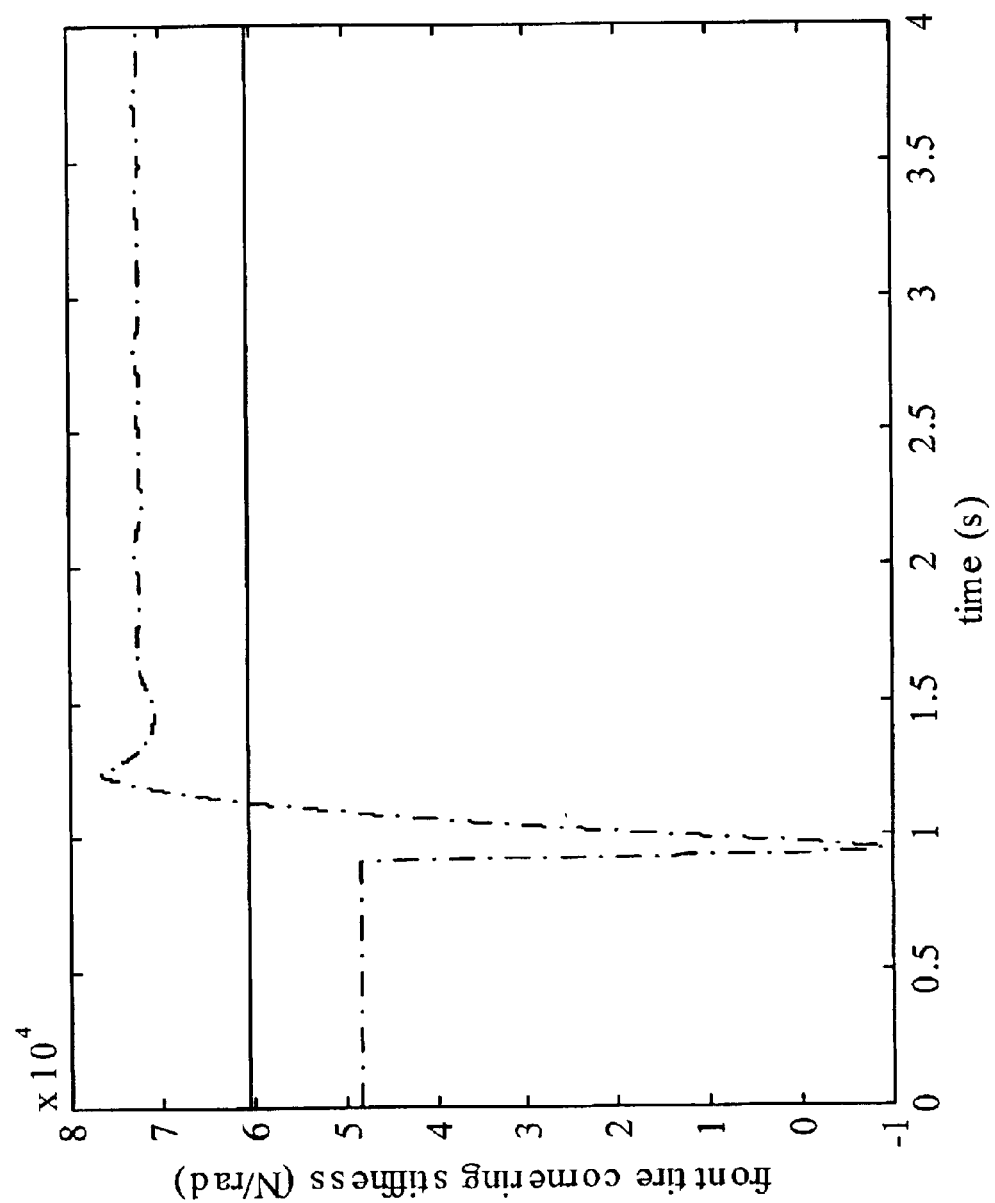
Figure 22:
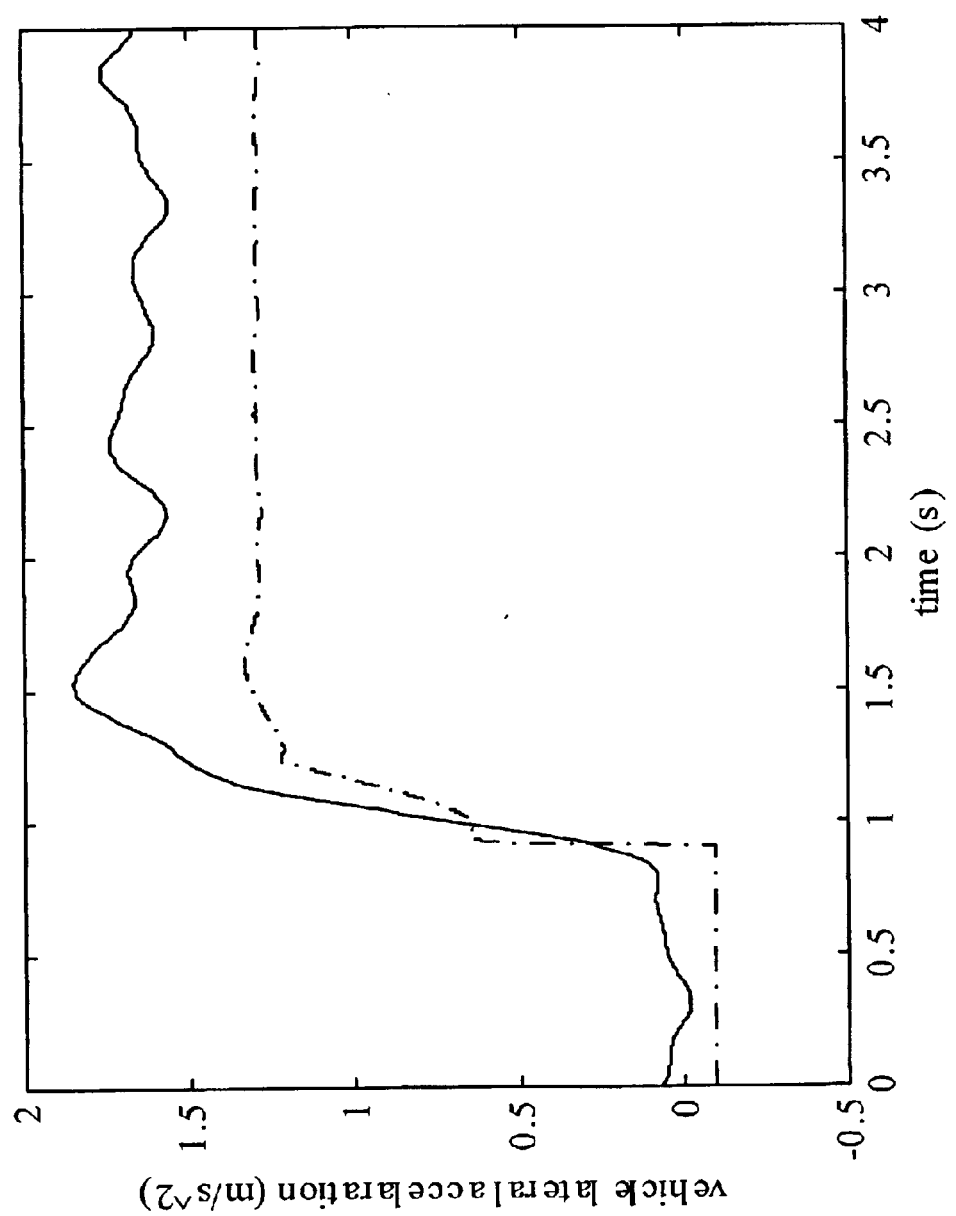
Figure 23:
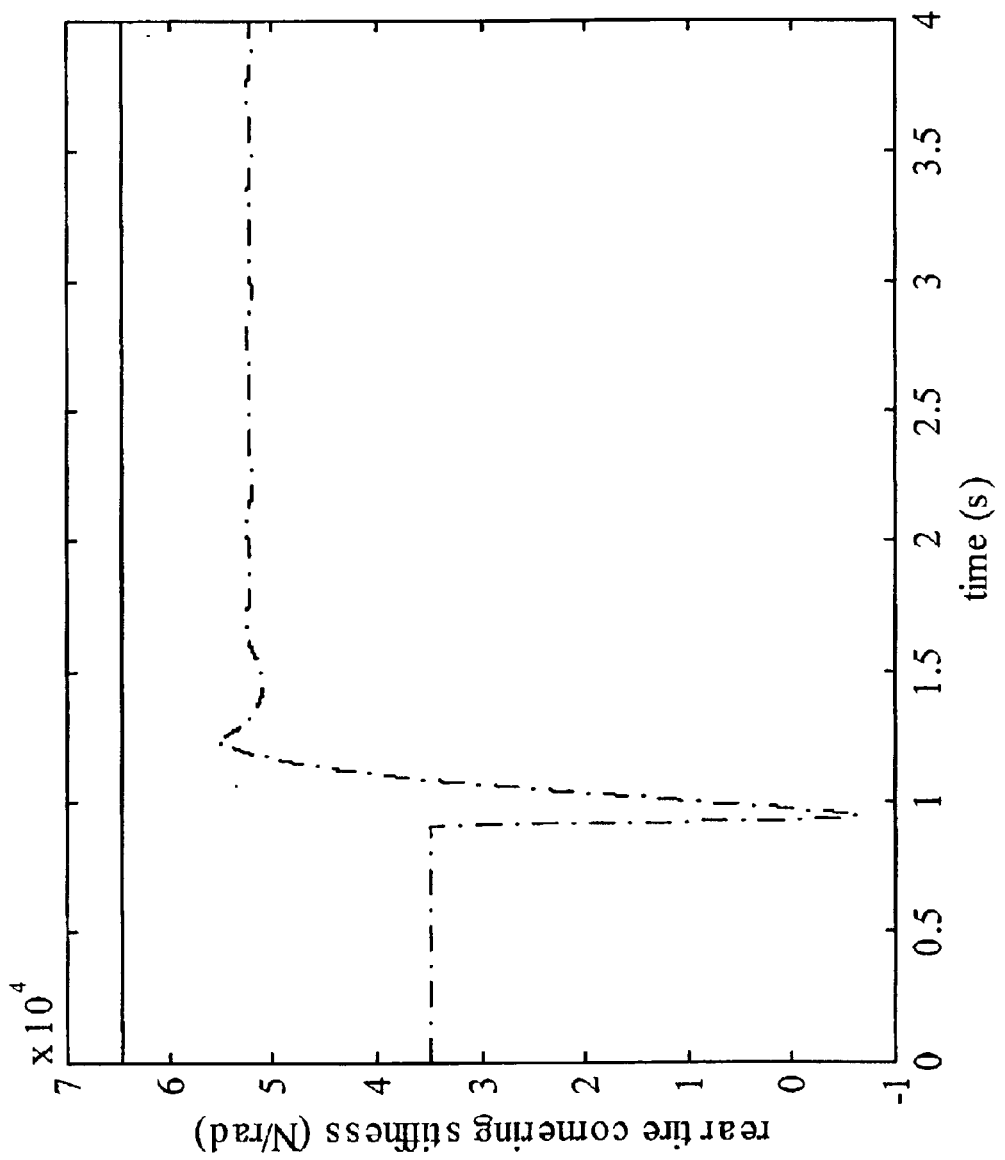

The residuals for lateral acceleration and front tire cornering stiffness obtained from Unit A2 are depicted in FIGS. 20 and 21 while in FIGS. 22 and 23 the lateral acceleration and the rear cornering stiffness are compared with the measured values. At the end, the following residual signature is observed $$R=[0\ 1\ 0\ 1\ 1\ 1] \qquad (7)$$

which indicates a steering inputs or $C_f$ fault.

The present invention supports implementation of a vehicle health monitor to increase the reliability of a passenger or other type of vehicle with experimental validation of the observer design and FDI scheme. While particular embodiments of the invention have been illustrated and described in accordance with vehicles, various modifications and combinations can be made without departing from the spirit and scope of the invention, and all such modifications, combinations, and equivalents are intended to be covered and claimed.

What is claimed is:

1. A method for fault diagnosis in a transport device comprising the steps of:

partitioning a transport device model into a plurality of subsystems, each subsystem comprising one or more modules;

associating a fault detector unit with each module in each subsystem;

defining a residual evaluation method for each subsystem;

evaluating data from said fault detector units in accordance with said residual evaluation method for each subsystem; and diagnosing a fault in accordance with said evaluated data.

2. The method of claim 1 wherein the step of defining a residual evaluation method for each subsystem comprises the step of defining a residual evaluation method selected from the group consisting of parity space method, observer method, and parameter identification method.

3. The method of claim 1 wherein the step of partitioning a transport device model into a plurality of subsystems comprises the step of partitioning said transport device model into a core subsystem and an external subsystem.

4. The method of claim 3 wherein the core subsystem comprises a transport device dynamics module, a tire module, a powertrain module, a steering module, a suspension module, and a brake module.

5. The method of claim 3 wherein the external subsystem comprises an environmental module, a driver module, a sensor module, a brake controller module, a suspension controller module, and a communication module.

6. The method of claim 3 wherein said subsystem modules are selected from the group of modules consisting of vehicle, tire, powertrain, steering, suspension, brake, environmental, driver, sensor, brake controller, suspension controller, communication, engine controller, fuel, air intake, combustion, exhaust, crank-shaft, transmission, coupling, supervisory controller, electric machine, controller, batteries/supercapacitors, tank, pump, servo-valve, and cylinder modules.

7. The method of claim 3 wherein said plurality of subsystems comprises a handling system, a propulsion system, and an auxiliary system.

8. A system for problem diagnosis in a transport device comprising:

a plurality of residual evaluation units;

a plurality of fault detector units in communication with said plurality of residual evaluation units, each of said plurality of fault detector units adapted to communicate fault data to at least one of said-residual evaluation units; and a supervisor unit adapted to analyze evaluated data from plurality of residual evaluation units and to diagnose a problem in accordance with said data from said plurality of residual evaluation units.

9. The system of claim 8 wherein each of said residual evaluation units evaluates fault data in accordance with a residual evaluation method selected from the group of evaluation methods consisting of parity space method, observer method, and parameter identification method.

10. The system of claim 8 wherein said plurality of residual evaluation units comprises a brake/suspension/steering residual evaluation unit, a tire/vehicle dynamic residual evaluation unit, and a powertrain/driver residual evaluation unit.

11. The system of claim 8 wherein each of said plurality of fault detector units comprises a primary residual generator adapted to generate fault data.

12. The system of claim 11 wherein said primary residual generator is adapted to generate a primary residual representing the error between a measured and calculated variable.

13. The system of claim 8 wherein each of said residual evaluation units comprises a secondary residual generator, a residual evaluator, and a decision unit.

14. The system of claim 8 wherein each of said plurality of fault detector units comprises a model associated with a module.

15. The system of claim 14 wherein said module is selected from the group consisting of transport device, tire, powertrain, steering, suspension, brake, environmental, driver, sensor, brake controller, suspension controller, communication, engine controller, fuel, air intake, combustion, exhaust, crank-shaft, transmission, coupling, supervisory controller, electric machine, controller, batteries/supercapacitors, tank, pump, servo-valve, and cylinder modules.

16. A transport device comprising:
- a first plurality of fault detector units associated with a first module in said transport device adapted to output residuals for said first module;
- a second plurality of fault detector units associated with a second module in said transport device adapted to output residuals for said second module;
- a first residual evaluation unit adapted to receive and process in accordance with a first residual evaluation method said residuals from said first plurality of fault detector units;
- a second residual evaluation unit adapted to receive and process in accordance with a second residual evaluation method said residuals from said second plurality of fault detector units; and
- a supervisor unit adapted to receive output from said first residual evaluation unit and said second residual evaluation unit and to diagnose a fault in accordance with said output from said first residual evaluation unit and said second residual evaluation unit.

17. The transport device of claim 16 wherein each of said fault detector units comprises a model and a primary residual generator adapted to generate a residual in accordance with output from said model.

18. The transport device of claim 16 wherein said first module is associated with a core subsystem.

19. The transport device of claim 16 wherein said second module is associated with an external subsystem.

20. The transport device of claim 16 wherein said first module and said second module are selected from the group of modules consisting of sensor, brake controller, suspension controller, communication, brake, driver, steering, transport device, suspension, powertrain, tire, environmental, engine controller, fuel, air intake, combustion, exhaust, crank-shaft, transmission, coupling, supervisory controller, electric machine, controller, batteries/supercapacitors, tank, pump, servo-valve, and cylinder modules.

21. The transport device of claim 16 wherein each of said residual evaluation units comprises a secondary residual generator a residual evaluator, and a decision unit.

22. The transport device of claim 16 wherein said first residual evaluation method and said second residual evaluation method are selected from the group of evaluation methods consisting of parity space method, observer method, and parameter identification method.

23. The transport device of claim 16 wherein said first module is in a handling system.

24. The transport device of claim 16 wherein said first module is in a propulsion system.

25. The transport device of claim 16 wherein said first module is in an auxiliary system.

* * * * *

UNITED STATES PATENT AND TRADEMARK OFFICE
CERTIFICATE OF CORRECTION

PATENT NO. : 6,766,230 B1
DATED : July 20, 2004
INVENTOR(S) : Rizzoni et al.

It is certified that error appears in the above-identified patent and that said Letters Patent is hereby corrected as shown below:

Column 3,
Line 53, please delete "testing" and insert -- testing, --.

Column 4,
Lines 14-18, please delete "$u_{0i}$, i = 1..m   are the input vectors
$\Delta u_i$, i = 1..m   are the input fault vectors
$\theta_{0i}$, i = 1..m   are the nominal parameter vectors
$\Delta \theta_i$, i = 1..m   are the parameter fault vectors
$x_i$, i = 1..m   are the state vectors" and insert -- $u_{0i}$, i = 1..m   are the input vectors
$\Delta u_i$, i = 1..m   are the input fault vectors
$\theta_{0i}$, i = 1..m   are the nominal parameter vectors
$\Delta \theta_i$, i = 1..m   are the parameter fault vectors
$x_i$, i = 1..m   are the state vectors --.

Lines 24-29, please delete

"$$\begin{cases} \dot{x}_1 = f_1(x_1, u_1, \theta_1) \\ y = h_1(x_1, u_1, \theta_1) + \Delta y \end{cases}, x_1 \in \Gamma_1 \qquad (1)$$

$$\vdots \qquad \vdots$$

$$\begin{cases} \dot{x}_m = f_m(x_m, u_m, \theta_m) \\ y = h_m(x_m, u_m, \theta_m) + \Delta y \end{cases}, x_m \in \Gamma_m$$"

and insert

--
$$\begin{cases} \dot{x}_1 = f_1(x_1, u_1, \theta_1) \\ y = h_1(x_1, u_1, \theta_1) + \Delta y \end{cases}, x_1 \in \Gamma_1$$

$$\vdots \qquad \vdots \qquad (1)$$

$$\begin{cases} \dot{x}_m = f_m(x_m, u_m, \theta_m) \\ y = h_m(x_m, u_m, \theta_m) + \Delta y \end{cases}, x_m \in \Gamma_m$$
--.

Line 31, please delete "$u_{0i,} = u_{0i} + \Delta u_i$, $\theta_i = \theta_{0i} + \Delta \theta_i$, $i = 1..m$" and insert
-- $u_{0i,} = u_{0i} + \Delta u_i$, $\theta_i = \theta_{0i} + \Delta \theta_i$, $i = 1..m$ --.

UNITED STATES PATENT AND TRADEMARK OFFICE
CERTIFICATE OF CORRECTION

PATENT NO. : 6,766,230 B1
DATED : July 20, 2004
INVENTOR(S) : Rizzoni et al.

It is certified that error appears in the above-identified patent and that said Letters Patent is hereby corrected as shown below:

Column 4 (cont'd),
Lines 37-44, please delete

"
$$\begin{cases} \dot{x}_1 = g_1(\hat{x}_1, u_1, \hat{\theta}_1, y) \\ \hat{y}_1 = h_1(\hat{x}_1, u_1, \hat{\theta}_1) \end{cases}, \hat{x}_1 \in \Gamma_1 \qquad (2)$$

$$\vdots \qquad \vdots$$

$$\begin{cases} \dot{x}_m = g_m(x_m, u_m, \hat{\theta}_m, y) \\ \hat{y}_m = h_m(\hat{x}_m, u_m, \hat{\theta}_m) \end{cases}, \hat{x}_m \in \Gamma_m$$
"

and insert $$\begin{cases} \dot{\hat{x}}_1 = g_1(\hat{x}_1, u_1, \hat{\theta}_1, y) \\ \hat{y}_1 = h_1(\hat{x}_1, u_1, \hat{\theta}_1) \end{cases}, \hat{x}_1 \in \Gamma_1$$

$$\vdots \qquad \vdots \qquad (2)$$

$$\begin{cases} \dot{\hat{x}}_m = g_m(x_m, u_m, \hat{\theta}_m, y) \\ \hat{y}_m = h_m(\hat{x}_m, u_m, \hat{\theta}_m) \end{cases}, \hat{x}_m \in \Gamma_m$$

--.

Line 48, please delete " $\hat{x}_i \to x_i$ for $t \to \infty$, $i=1...n$ (3) "

and insert $\hat{x}_i \to x_i$ for $t \to \infty$, $i = 1..n$ (3) --.

Column 5,
Line 41, please delete "$a_{iat} \leq 0.2g$" and insert -- $a_{lat} \leq 0.2g$ --.
Lines 45-50, please delete "
$$\begin{cases} \dot{v}_x = \dfrac{F_x}{M} + v_y \dot{\psi} \\ \dot{v}_y = -\dfrac{2}{M}(C_f + C_r)\dfrac{v_y}{v_x} - \dfrac{2}{M}(aC_f - bC_r)\dfrac{\dot{\psi}}{v_x} - v_x\dot{\psi} + \dfrac{2C_f}{MG}\delta \\ \ddot{\psi} = -\dfrac{2}{I}(aC_f - bC_r)\dfrac{v_y}{v_x} - \dfrac{2}{I}(a^2 C_f + b^2 C_r)\dfrac{\dot{\psi}}{v_x} + \dfrac{2aC_f}{IG}\delta \end{cases} \qquad (4)$$
"

UNITED STATES PATENT AND TRADEMARK OFFICE
CERTIFICATE OF CORRECTION

PATENT NO. : 6,766,230 B1
DATED : July 20, 2004
INVENTOR(S) : Rizzoni et al.

It is certified that error appears in the above-identified patent and that said Letters Patent is hereby corrected as shown below:

Column 5 (cont'd),
and insert $$\begin{cases} \dot{v}_x = \frac{F_x}{M} + v_y \psi \\ \dot{v}_y = -\frac{2}{M}(C_f + C_r)\frac{v_y}{v_x} - \frac{2}{M}(aC_f - bC_r)\frac{\psi}{v_x} - v_x \psi + \frac{2C_f}{MG}\delta \\ \dot{\psi} = -\frac{2}{J}(aC_f - bC_r)\frac{v_y}{v_x} - \frac{2}{J}(a^2 C_f + b^2 C_r)\frac{\psi}{v_x} + \frac{2aC_f}{JG}\delta \end{cases}$$

(4) --.

Column 6,
Lines 2-16, please delete

"
$$\dot{x} = \left(\frac{\partial H(\hat{x})}{\partial \hat{x}}\right)^{-1} M(\hat{x}) sign(V(t) - H(\hat{x})) + B\delta$$  (5) "

where
  $H(x) = [h_1(x)\ h_2(x)\ h_3(x)]$
  $h_1(x) = \psi = r$
  $h_2(x) = \dot{r}$
  $h_3(x) = \ddot{r}$
  $\gamma(t) = [v_1(t)\ v_2(t)\ v_3(t)]$
  $v_1(t) = r(t)$
  $v_{i+1} = (m_i((x)) sign\ (x(v_i(t) - h_i(\hat{x}(t))))_{eq},\ i=1,2$
  $M(\hat{x}) = diag\ (m_1(\hat{x})\ m_2(\hat{x})\ m_3(\hat{x}))$ and insert $$\dot{x} = \left(\frac{\partial H(\hat{x})}{\partial \hat{x}}\right)^{-1} M(\hat{x}) sign(V(t) - H(\hat{x})) + B\delta \quad (5)$$

where
  $H(x) = [h_1(x)\ h_2(x)\ h_3(x)]$
  $h_1(x) = \psi = r$
  $h_2(x) = \dot{r}$
  $h_3(x) = \ddot{r}$
  $Y(t) = [v_1(t)\ v_2(t)\ v_3(t)]$
  $v_1(t) = r(t)$
  $v_{i+1} = \left(m_i((\hat{x})) sign\ (x(v_i(t) - h_i(\hat{x}(t))))\right)_{eq},\ i = 1,2$
  $M(\hat{x}) = diag\ (m_1(\hat{x})\ m_2(\hat{x})\ m_3(\hat{x}))$

--.

UNITED STATES PATENT AND TRADEMARK OFFICE
CERTIFICATE OF CORRECTION

PATENT NO. : 6,766,230 B1
DATED : July 20, 2004
INVENTOR(S) : Rizzoni et al.

It is certified that error appears in the above-identified patent and that said Letters Patent is hereby corrected as shown below:

<u>Column 6 (cont'd),</u>
Line 33, please delete " $R=[a_{lat}-\hat{a}_{y1}\delta-\hat{\delta}a_{lat}-\hat{a}_{y2}C_f-\hat{C}_f a_{lat}-\hat{a}_{y3}C_r-\hat{C}_r]$ (6) "

and insert -- $R = [a_{lat} - \hat{a}_{y1}\ \delta - \hat{\delta}\ a_{lat} - \hat{a}_{y2}\ C_f - \hat{C}_f\ a_{lat} - \hat{a}_{y3}\ C_r - \hat{C}_r]\ (6)$ --.

<u>Column 8,</u>
Line 42, please delete "said-residual," and insert -- said residual --.

<u>Column 10,</u>
Line 20, please delete "generator a" and insert -- generator, a --.

Signed and Sealed this

Thirtieth Day of August, 2005

JON W. DUDAS
*Director of the United States Patent and Trademark Office*